United States Patent
Doyle et al.

(10) Patent No.: US 10,482,536 B1
(45) Date of Patent: Nov. 19, 2019

(54) PRIORITIZATION OF INSURANCE REQUOTATIONS

(71) Applicant: Allstate Insurance Company, Northbrook, IL (US)

(72) Inventors: Alexander Doyle, Chicago, IL (US); Ryan Dunn, Grayslake, IL (US); Cristina I. Gheorghe, Chicago, IL (US); Eric Huls, Chicago, IL (US); Michael A. Lavigne, Prospect Heights, IL (US); David MacInnis, Lake Forest, IL (US); Christopher Joseph DeCleene, Kenmore, WA (US)

(73) Assignee: Allstate Insurance Company, Northbrook, IL (US)

( * ) Notice: Subject to any disclaimer, the term of this patent is extended or adjusted under 35 U.S.C. 154(b) by 137 days.

(21) Appl. No.: 14/327,242

(22) Filed: Jul. 9, 2014

(51) Int. Cl.
*G06Q 40/08* (2012.01)

(52) U.S. Cl.
CPC .................... *G06Q 40/08* (2013.01)

(58) Field of Classification Search
CPC ........ G06Q 40/00; G06Q 40/02; G06Q 40/08; G06Q 50/22; G06Q 50/24
USPC .......................................................... 705/4
See application file for complete search history.

(56) References Cited

U.S. PATENT DOCUMENTS

| | | |
|---|---|---|
| 4,831,526 A | 5/1989 | Luchs et al. |
| 6,186,793 B1 | 2/2001 | Brubaker |
| 6,453,302 B1 | 9/2002 | Johnson et al. |
| 6,519,571 B1 | 2/2003 | Guheen et al. |
| 7,143,051 B1 | 11/2006 | Hanby et al. |
| 7,319,970 B1 | 1/2008 | Simone |
| 7,333,940 B2 | 2/2008 | Best-Devereux |

(Continued)

FOREIGN PATENT DOCUMENTS

| | | |
|---|---|---|
| EP | 1288815 A1 | 3/2003 |
| WO | 2002044841 A2 | 6/2002 |

OTHER PUBLICATIONS

Using Blitz Lead Management Software to Re-Quote Leads from Alliance. Copyright 209-2013 Blitz Lead Manager Blog. www.blitzleamanager.com/blog/indexphp/2012/using-blitz-to-re-quote-leads-from-alliance/, dated Dec. 18, 2013. 4 pages (Year: 2013).*

(Continued)

*Primary Examiner* — Benjamin S Brindley
(74) *Attorney, Agent, or Firm* — Banner & Witcoff, Ltd.

(57) ABSTRACT

A computer-assisted method for providing re-quotations for insurance coverage may include receiving a list of insurance leads corresponding to individuals who received a previous quotation for insurance coverage but did not purchase the insurance coverage and identifying a difference between the previous quotation and a new quotation. This difference may include an increase in offered insurance coverage and/or a reduction in cost. A computing device may calculate a probability for each of the individuals on the list using a regression model based, at least in part, on the identified difference. In some cases, the regression model may be associated with individual states. In other cases, the regression model may correspond to a plurality of states. The regression model may output a probability that a resident of a particular state will purchase insurance in response to a re-quotation for insurance coverage, where individuals may then be ranked based on the probability.

20 Claims, 7 Drawing Sheets

(56) References Cited

U.S. PATENT DOCUMENTS

| | | | |
|---|---|---|---|
| 8,090,598 B2 | 1/2012 | Bauer et al. | |
| 8,355,934 B2* | 1/2013 | Virdhagriswaran | G06Q 10/067 705/4 |
| 8,370,155 B2 | 2/2013 | Byrd et al. | |
| 8,463,624 B2 | 6/2013 | Hashim | |
| 8,478,769 B2 | 7/2013 | Goldfarb | |
| 8,527,288 B2* | 9/2013 | Tivey | G06Q 30/02 705/1.1 |
| 8,577,699 B1 | 11/2013 | Diener et al. | |
| 8,606,512 B1 | 12/2013 | Bogovich et al. | |
| 8,719,063 B1* | 5/2014 | Wade | G06Q 40/08 705/4 |
| 8,799,028 B1 | 8/2014 | Warden et al. | |
| 8,799,125 B2* | 8/2014 | Schumann, Jr. | G06Q 40/08 705/35 |
| 9,521,205 B1 | 12/2016 | Liao et al. | |
| 2002/0194033 A1 | 12/2002 | Huff | |
| 2003/0004760 A1 | 1/2003 | Schiff et al. | |
| 2003/0074277 A1 | 4/2003 | Foutz | |
| 2004/0044549 A1 | 3/2004 | Loop | |
| 2006/0100912 A1 | 5/2006 | Kumar et al. | |
| 2006/0200432 A1 | 9/2006 | Flinn et al. | |
| 2006/0200434 A1 | 9/2006 | Flinn et al. | |
| 2007/0203872 A1 | 8/2007 | Flinn et al. | |
| 2008/0065426 A1 | 3/2008 | Ziade et al. | |
| 2008/0294468 A1* | 11/2008 | Toland, Jr. | G06Q 40/00 705/4 |
| 2009/0070152 A1 | 3/2009 | Sperske et al. | |
| 2009/0119133 A1* | 5/2009 | Yeransian | G06Q 40/08 705/4 |
| 2009/0119204 A1 | 5/2009 | Akella et al. | |
| 2009/0216772 A1 | 8/2009 | Goldfarb | |
| 2010/0004957 A1 | 1/2010 | Ball | |
| 2010/0063890 A1* | 3/2010 | Huckleby | G06Q 30/02 705/26.1 |
| 2010/0100398 A1 | 4/2010 | Auker et al. | |
| 2010/0146414 A1 | 6/2010 | Dongole et al. | |
| 2010/0153137 A1 | 6/2010 | Rao et al. | |
| 2010/0223078 A1 | 9/2010 | Willis et al. | |
| 2011/0161116 A1 | 6/2011 | Peak et al. | |
| 2011/0161117 A1 | 6/2011 | Busque et al. | |
| 2011/0166893 A1* | 7/2011 | McConnell | G06Q 10/10 705/4 |
| 2012/0109692 A1* | 5/2012 | Collins | G06Q 40/08 705/4 |
| 2012/0166228 A1* | 6/2012 | Singleton | G06Q 40/08 705/4 |
| 2012/0197667 A1 | 8/2012 | Reid | |
| 2012/0209633 A1 | 8/2012 | Brookes et al. | |
| 2012/0226391 A1 | 9/2012 | Fryer et al. | |
| 2012/0271663 A1 | 10/2012 | Amigo | |
| 2012/0278110 A1 | 11/2012 | Jones et al. | |
| 2013/0013346 A1 | 1/2013 | O'Connor et al. | |
| 2013/0066656 A1* | 3/2013 | Hanson | G06Q 40/08 705/4 |
| 2013/0110556 A1 | 5/2013 | Griffith | |
| 2013/0110560 A1* | 5/2013 | Syed | G06Q 40/08 705/4 |
| 2013/0204645 A1 | 8/2013 | Lehman et al. | |
| 2013/0325517 A1 | 12/2013 | Berg | |
| 2014/0012797 A1 | 1/2014 | Rao et al. | |
| 2014/0012870 A1 | 1/2014 | Wark | |
| 2014/0025827 A1 | 1/2014 | Konuk et al. | |
| 2014/0074512 A1 | 3/2014 | Hare et al. | |
| 2014/0089511 A1 | 3/2014 | McLean | |
| 2014/0122688 A1 | 5/2014 | Partida | |
| 2014/0222469 A1* | 8/2014 | Stahl | G06Q 40/08 705/4 |
| 2014/0298194 A1 | 10/2014 | Prasad et al. | |
| 2014/0304429 A1 | 10/2014 | Softky | |
| 2015/0006206 A1* | 1/2015 | Mdeway | G06Q 40/08 705/4 |
| 2015/0149390 A1 | 5/2015 | Brdiczka et al. | |
| 2015/0347183 A1 | 12/2015 | Borthakur | |
| 2016/0078136 A1 | 3/2016 | Nijjer | |
| 2016/0335260 A1 | 11/2016 | Convertino et al. | |

OTHER PUBLICATIONS

Feb. 16, 2018—U.S. Final Office Action—U.S. Appl. No. 14/338,108.
Feb. 26, 2018—U.S. Non-Final Office Action—U.S. Appl. No. 14/327,222.
Jan. 18, 2019—U.S. Final Office Action—U.S. Appl. No. 14/338,108.
Jan. 25, 2019—U.S. Final Office Action—U.S. Appl. No. 14/338,097.
Jul. 27, 2018—U.S. Non-Final Office Action—U.S. Appl. No. 14/338,097.
Aug. 6, 2018—U.S. Non-Final Office Action—U.S. Appl. No. 14/338,108.
Sep. 4, 2018—U.S. Final Office Action—U.S. Appl. No. 14/327,222.
Aug. 11, 2016—U.S. Non-Final Office Action—U.S. Appl. No. 14/338,108.
Dec. 21, 2016—U.S. Final Office Action—U.S. Appl. No. 14/338,108.
Jan. 4, 2017—U.S. Final Office Action—U.S. Appl. No. 14/327,222.
Mar. 22, 2017—U.S. Non-Final Office Action—U.S. Appl. No. 14/338,108.
Aug. 3, 2017—U.S. Office Action—U.S. Appl. No. 14/338,097.
Jan. 25, 2018—U.S. Final Office Action—U.S. Appl. No 14/338,097.
RoboAgent—Automation of prospecting for new business, Available ROBO-Agent Modules, www.roboagent.net/addons.html, dated Dec. 18, 2013, 1 page.
Using Blitz Lead management Software to Re-Quote Leads from Alliance, Copyright © 2009-2013 Blitz Lead Manager Blog, www.blitzleadermanager.com/blog/indexphp/2012/using-blitz-to-re-quote-leads-from-alliance/, dated Dec. 18, 2013, 4 pages.
Insurance Data Migrations—Case Study Detail, Grapevine Software Ltd, QUOTEL ITT & NORTHPARK (SSP)—System Integration, © Copyright 2009-2013 New City Software Ltd, www.insurancedatamigrations.co.uk/index.php?mact=News,cntn01,detail0&cntnt01articleid=16&cntnt01origid=75&cntnt01detailtemplate=CaseStudy&cntnt . . . , dated Dec. 18, 2013, 2 pages.
"Prevent premium leakage, asess risk and deliver support claims services"; Insurance GIS Solutions; Retrieved Apr. 4, 2014; <http://www.mapinfo.com/industries/industries-gis-solutions/>.
"Location Analytics: The Future is Where"; Linda Hecht; Innovation Insights; Nov. 1, 2013; <http:insights.wired.com/profiles/blogs/location-analytics-where-the-future-will-be#axzz2xeGvfhRo>.
"GIS for Insurance"; ESRI; GIS Best Practices Series; Mar. 2012; Retrieved Apr. 4, 2014.
"Maptitude Mapping Software"; Caliper Corporation; retrieved Jul. 10, 2014; <http://www.maptitude.com/maptitude/insurance/defaulthtm>.
"Web Map Layers for Insurance: Real-time reporting and analysis"; Cadcorp (V01); Retrieved Apr. 4, 2014.
"EZLynx Management System Manual"; Elynx; Webcetera, Inc., 2013; retrieved on Apr. 7, 2014.
"Insurance Tech Trends 2013: Elements of Postdigital"; White, Mark, Bill, Briggs, Goldberg, Andrew, O'Mara, Matthew; Deloitte Development LLC; Retrieved Apr. 7, 2014.
May 31, 2019 (U.S.) Non-Final Office Action—U.S. Appl. No. 14/338,097.
May 31, 2019 (U.S.) Non-Final Office Action—U.S. Appl. No. 14/338,108.

\* cited by examiner

| Maximum Likelihood Estimates – State Model | | |
|---|---|---|
| Parameter | Estimate | Description |
| Intercept | $\alpha_1$ | Intercept |
| Premium per item | $\alpha_2$ | Premium / Vehicles |
| 2 + items | $\alpha_3$ | 2 + cars on policy |
| 1 item | $\alpha_4$ | 1 car on policy |
| Credit >= 2 | $\alpha_5$ | 2 or more credit orders for customer |
| Credit = 1 | $\alpha_6$ | Only 1 credit order for customer |
| No-hit = mixed | $\alpha_7$ | Mixed credit no-hit code |
| Youngest op. age | $\alpha_8$ | Max (youngest op. age, max age) |
| 2 ops, 1 car | $\alpha_9$ | 2 drivers with only 1 vehicle |
| Agency no credit hit | $\alpha_{10}$ | Quoted at an agent with no credit hit |
| Channel - WEB | $\alpha_{11}$ | Customer quoted online |

FIG. 6

| Maximum Likelihood Estimates --National Model ||||
|---|---|---|---|
| Parameter | | Estimate | Description |
| Intercept | | $\omega_1$ | Intercept |
| Existing Customer | 1 | $\omega_2$ | Previous customer at 1st quote |
| Premium + 1 | | $\omega_3$ | premium (1 item) |
| Premium + 2 | | $\omega_4$ | Premium per item (2+ items) |
| recency | | $\omega_5$ | $f(\omega 5)$ |
| channel | CIC | $\omega_6$ | origin for 1st quote -- Call |
| channel | WEB | $\omega_7$ | origin for 1st quote -- Web |
| Ins Score (derived) | | $\omega_8$ | Derived using raw score |
| Early discount | 0 | $\omega_9$ | 1st quote no early discount offered |
| Electronic Discount | 1 | $\omega_{10}$ | 1st quote with electronic only discount |
| Youngest Operator | | $\omega_{11}$ | Max (youngest op. age, max age) |
| cars | 4 | $\omega_{12}$ | 4+ items |
| cars | 3 | $\omega_{13}$ | 3 items |
| Cars | 2 | $\omega_{14}$ | 2 items |
| Quote State | AR | $\omega_{15}$ | State = <State Name> |

FIG. 7

PRIORITIZATION OF INSURANCE REQUOTATIONS

BACKGROUND

People seeking insurance coverage (e.g., vehicle insurance, homeowner insurance, life insurance, commercial property insurance, etc.), sometimes request an insurance quotation from two or more different insurance agents and/or insurance agencies associated with different insurance providers. After comparing different competitive insurance quotations, the insurance consumer may decide to purchase insurance coverage from the insurance provider having the price and/or coverage noted in the quotation that best meets his or her needs. Because many of these insurance quotations do not close or otherwise result in an insurance policy, the insurance provider may have a data repository containing a large number of closed (e.g., binding) and/or unclosed (e.g., non-binding) insurance quotations.

The insurance provider may desire to use these previous insurance consumer contacts as a source of potential insurance leads. The insurance provider may rely on their affiliated insurance agents or agencies to follow up on previously unclosed quotations. Therefore, a uniform process and/or methodology to allow insurance agents or agencies to efficiently manage and pursue multiple insurance re-quotations in a prioritized, optimized manner is desirable.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, devices, computer-implemented methods, and computer-readable media for prioritizing an insurance re-quotation process. For example, a computer-assisted method may include receiving, by at least one computing device, a list of insurance leads. The insurance leads may include information about individuals who received a previous quotation for insurance coverage but did not purchase the insurance coverage. The computing device may identify a difference between the previous quotation for insurance coverage and a new quotation for insurance coverage. This identified difference may include at least one of an increase in offered insurance coverage and a reduction in cost. The computing device may then calculate a probability for each of the individuals on the list using a statewide regression model based, at least in part on the identified difference. An output generated by the statewide regression model may correspond to a probability that a resident of a particular state will purchase insurance in response to a re-quotation for insurance coverage. The computing device may then assign a ranking to each of the individuals on the list based on the probability output from the statewide regression model, where the ranking is calculated in relation to other individuals on the list. For example a ranked list may include groupings of insurance quotations, where each grouping given a grade representative of a likelihood that an associated individual will purchase insurance in response to the insurance re-quotation.

In accordance with additional aspects of the disclosure, various devices and systems may be used to implement a system comprising a data repository and a computing device having a processor and a non-transitory memory device. In some cases, the data repository may store information associated with insurance quotations that did not result in an insurance coverage purchase. The computing device may be communicatively coupled to the data repository, such as to receive a list containing information about unclosed insurance quotations. In some cases, the processor may process instructions stored in the non-transitory memory to cause the computing device to retrieve the list of insurance leads from the data repository, insurance leads comprising individuals who received an insurance quotation but did not purchase insurance coverage in response to the insurance quotation. The computing device may then calculate, using a state regression model, a probability that an individual would purchase insurance coverage after receiving a re-quotation for insurance coverage. Each individual associated with the list may be assigned such a probability. In some cases, the state regression model may include an input comprising a discount not previously offered to the individual. The computing device may associate a ranking to each individual based on the calculated probability. This ranking may correspond to a likelihood that the individual will purchase insurance coverage in response to a re-quotation, where the ranking is determined in relation to the other individuals in the list. The computing device may then communicate, via a network, a ranked list to an insurance agent, a call center and/or insurance agency for use in providing insurance re-quotations to individuals associated with the list. The ranking may be used to determine an order in which to contact the individuals.

In accordance with additional aspects of the disclosure, a non-transitory computer readable medium may store instructions that, when executed by the processor, cause the processor to retrieve a first list of insurance leads from the data repository. These insurance leads may include individuals associated with a first state that received an insurance quotation, but did not purchase insurance coverage in response to the insurance quotation. in some cases, a second list of insurance leads may be retrieved from the data repository, where the second list comprises individuals associated with a second state that received an insurance quotation, but did not purchase insurance coverage in response to the insurance quotation. The computing device may then calculate, such as by using a first state regression model corresponding to the first state, a probability that each individual associated with the first list of insurance leads would purchase insurance coverage after receiving a re-quotation for insurance coverage. Similarly, the computing device may calculate, using a second state regression model corresponding to the second state, a probability that each individual associated with the second list of insurance leads would purchase insurance coverage after receiving a re-quotation for insurance coverage. Inputs to the first and second state logistic regression models may include a discount not previously offered to the individual. In some cases, the computing device may generate a first ranked list from the first list of insurance leads and a second ranked list from the second list of insurance leads. The first ranked list and the second ranked list may include a plurality of grade classifications that correspond to a subset of individuals associated with the respective lists. Each individual may be assigned a grade classification based on the probability that the individual would purchase insurance when offered a re-quotation for insurance coverage.

In accordance with additional aspects of the disclosure, an illustrative method may include receiving, by at least one computing device, a list of insurance leads. The insurance leads may include individuals who received a previous quotation for insurance coverage but did not purchase the insurance coverage. The computing device may identify a difference between the previous quotation for insurance coverage and a new quotation for insurance coverage, wherein the difference comprises at least one of an increase in offered insurance coverage and a reduction in cost. The computing device may then calculate a probability for each of the individuals on the list using a national regression model based, at least in part on the identified difference. An output of the national regression model may correspond to the probability that an individual will purchase insurance in response to a re-quotation for insurance coverage. In some cases, an input to the national regression model may include a state of residence of the individual. Once the probabilities are computed for each individual associated with the list, the computing device may assign a ranking to each of the individuals on the list based on the probability output from the national regression model. In some cases, the ranking may be determined in relation to other individuals on the list.

In accordance with additional aspects of the disclosure, an illustrative system may include a data repository storing information associated with insurance quotations that did not result in an insurance coverage purchase and a computing device communicatively coupled to the data repository, such as via a network. The computing device may include a processor and a non-transitory memory device that may store instructions that, when executed by the processor, cause the computing device to retrieve a list of insurance leads from the data repository. In some cases, the insurance leads may comprise individuals who received an insurance quotation but did not purchase insurance coverage in response to the insurance quotation. The computing device may calculate for each individual associated with the list of insurance leads, a probability that the individual would purchase insurance coverage after receiving a re-quotation for insurance coverage using a nationwide regression model. An input to the national regression model may include a discount not previously offered to the individual. The computing device may assign a ranking to each individual based on the probability and communicate, via the network, a ranked list to an insurance agent for use in providing the re-quotation to the individuals associated with the list. In some cases, the ranking may be used to determine which of the individuals to target in a marketing campaign and/or an order in which each individual is contacted.

In accordance with additional aspects of the disclosure, an illustrative non-transitory computer readable medium may store instructions that, when executed by a processor, may cause the processor to retrieve a list of insurance leads from the data repository. The data repository may store insurance leads associated with individuals resident in a first state and individuals resident in a second state. In some cases, the individuals may have received an insurance quotation but did not purchase insurance coverage in response to the insurance quotation. The processor may then be caused to calculate, using a nationwide regression model, a probability that each individual associated with the list of insurance leads would purchase insurance coverage after receiving a re-quotation for insurance coverage. An input to the nationwide logistic regression model may include a discount not previously offered to the individual. The processor may then generate a first ranked list associated with the first state based on the list of insurance leads, wherein the first ranked list may include a listing of individuals classified using a plurality of grade classifications. The grade classification may be based on the probability that the individual would purchase insurance when offered a re-quotation for insurance coverage. The processor may also generate a second ranked list associated with the second state based on the list of insurance leads. The second ranked list may include a listing of individuals classified using a plurality of grade classifications. The grade classification may be based on the probability that the individual would purchase insurance when offered a re-quotation for insurance coverage. In some cases, the grade classifications associated with the first state may be different from the grade classifications associated with the second state.

According to an aspect of the invention, an input corresponding to vehicle insurance coverage associated with one or more state regression model and/or to the national regression model may include one or more of zip code, gender, marital status, driving history, vehicle year, vehicle make, vehicle model, ownership status of real estate, credit worthiness, and length of time with current automobile insurer.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 6 shows illustrative inputs and weightings used for an illustrative state regression model for prioritizing a plurality of insurance leads, according to one or more aspects of the disclosure.

FIG. 7 shows illustrative inputs and weightings used for an illustrative national regression model for prioritizing a plurality of insurance leads, according to one or more aspects of the disclosure.

DETAILED DESCRIPTION

Figure 1:
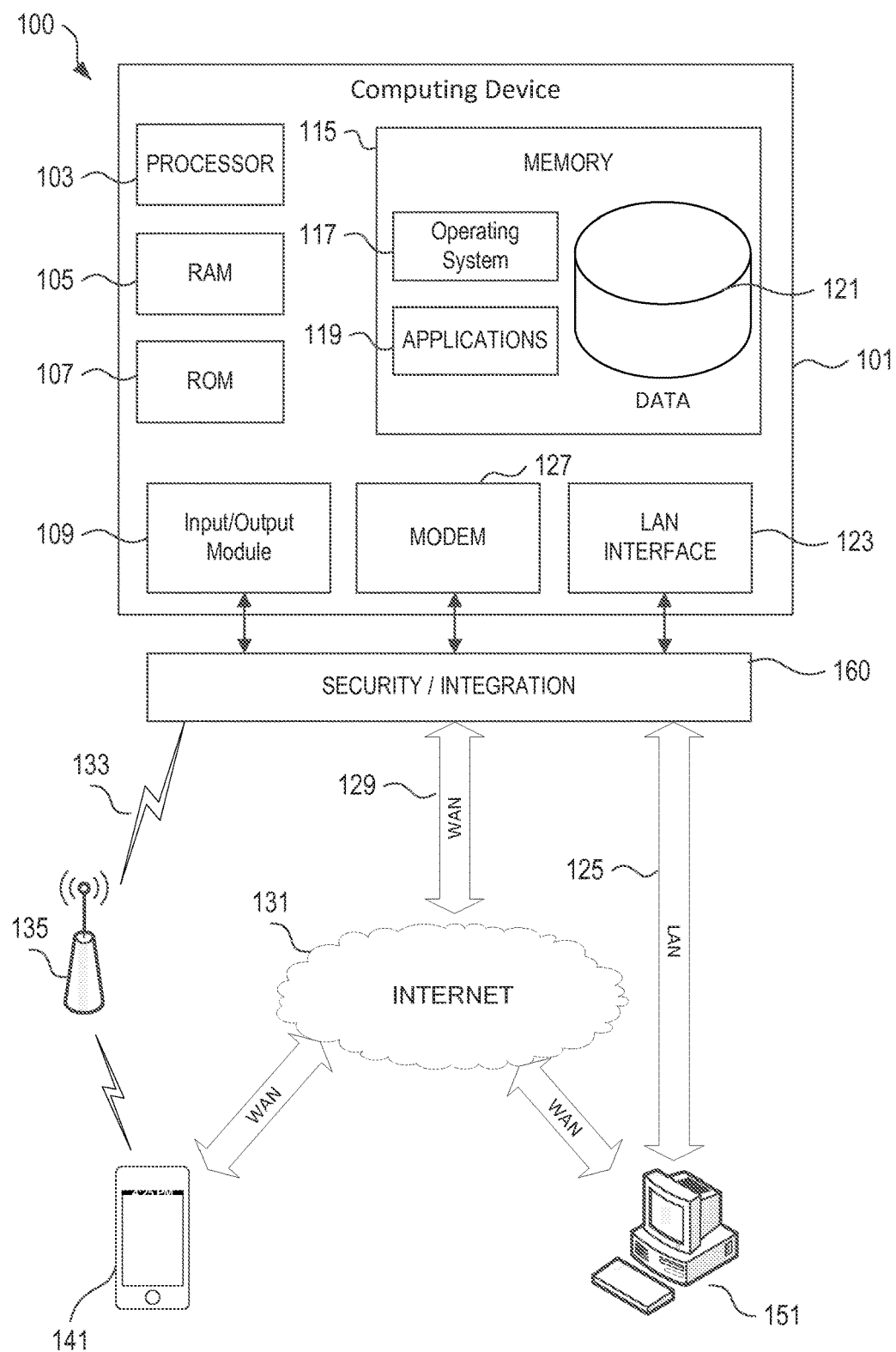
FIG. 1 illustrates a network environment and computer systems that may be used to implement aspects of the property inspection system.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Insurance consumers may obtain quotations from one or more insurance providers when shopping for insurance coverage (e.g., home insurance, automobile insurance, health insurance, rental insurance, and the like). During this process, the insurance consumer may initially provide limited information to an insurance agent by telephone, in-person, or some other method (e.g., email, text message, etc.). In some cases, the insurance consumer may provide this information via an online portal (e.g., a web page) associated with an insurance provider to enter information about the requested insurance coverage and/or additional demographic information. Once this initial information has been processed, the insurance provider, through the agent and/or the web portal, may provide a quotation including premium information and coverage information. After receiving this initial quotation, the insurance consumer may contact an associated insurance agent and/or agency to further customize the insurance quotation to his or her needs. For example, the insurance consumer may provide further demographic information and/or provide further information to clarify or otherwise define his or her insurance needs. Similarly, the insurance agent and/or agency may request additional information (e.g., a credit history, an employment history, an insurance claims history, etc.) to customize the insurance coverage and/or premiums to the requesting insurance consumer and/or to determine whether the insurance consumer is eligible for any discounts.

In an illustrative example, an insurance consumer may contact an insurance provider for a quotation for insurance coverage, such as by contacting an insurance agent or agency (e.g., an in-person visit, a telephone call, an email, etc.), in response to a call from a call center associated with the insurance provider, and/or in response to a mailing. The insurance consumer may provide contact information and/or demographic information, such as a name, an address, a phone number, an email address, and the like, to the insurance agent and/or agency. This information may include locality information (e.g., a city, a region, a state, etc.), a marital status, gender information, an age and/or an age range (e.g., under age 25, age 25-64, age 65 and older), approximate credit rating information (e.g., good, bad, average, etc.). In some cases, when information is entered as a range (e.g., an age range, approximate credit rating, etc.) the insurance provider may provide a quotation based on a representative value within the particular range. (e.g., age 18, age 30, age 65, etc.). In some cases, the insurance consumer may provide information about the vehicle to be insured, such as a type and/or age of the vehicle, usage information (e.g., pleasure only, less than 10 miles per day, 10 or more miles per day, etc.), and driving record information (e.g., no violations, 1 at-fault accident, more than 1 at-fault accident, etc.). The insurance provider may use this, and other information, to determine whether the insurance consumer is eligible to receive any of the possible discounts, such as a multi-policy discount, a good driver discount, an electronic billing discount, an early acceptance discount, and/or the like.

In some cases, a particular state may define minimum coverage limits and/or coverage types, such that an initial quotation may be provided based on the required coverage limits for residents of that state. For example, Illinois law requires automobile insurance to minimally include liability coverage amounts of $20,000 per individual, $40,000 per accident and $15,000 in property damage, while Arkansas law requires coverage limits of $25,000, $50,000, and $25,000 respectively. In some cases, states may require different types of insurance coverage. For example, West Virginia requires liability insurance coverage (e.g., property damage coverage of $10,000, and bodily injury coverage of $20,000/$40,000) and uninsured motorist coverage (e.g., property damage coverage of $10,000, and bodily injury coverage of $20,000/$40,000).

The insurance consumer may then provide information about the desired insurance coverage (e.g., automobile insurance, a boat insurance, motorcycle insurance, recreational vehicle insurance, motorhome insurance, etc.). For example, for a requested quotation for vehicle insurance, the insurance consumer may provide information about a desired amount of liability coverage, physical damage coverage, and/or the like. In some cases, the insurance provider may simplify the initial quotation process by limiting the choices available to the insurance consumer, such as by using a specified coverage limit (e.g., a bodily injury and/or property damage liability limits). For example, the insurance provider may provide an initial insurance quotation based on liability coverage limits of 100/300/50, where liability for an individual injury may be limited at $100,000, liability resulting from an entire accident would be limited to $300,000, and property damage liability would be limited at $50,000. In some cases, the insurance consumer and/or the insurance provider may provide information about other desired insurance coverage including, but not limited to, collision coverage, comprehensive coverage, medical coverage, personal injury protection, uninsured motorist coverage, underinsured motorist coverage, rental reimbursement, umbrella liability coverage and/or the like.

Once an initial quotation has been provided, the insurance agent may revise the insurance quotation based on feedback from the insurance consumer, such as by adjusting coverage and/or deductible amounts, applying additional discounts, and the like. The insurance consumer may then decide whether to accept the terms of the insurance quotation and purchase insurance coverage from the insurance provider based, at least in part, on the terms set forth in the insurance quotation.

The insurance provider may store information about the insurance quotations provided to insurance consumers in a data repository for both binding insurance quotations (e.g., a quotation resulting in a sale of insurance coverage) and non-binding insurance quotations that did not result in a sale. In some cases, the unclosed (e.g., non-binding) insurance quotations may be a used as a resource of potential sales leads by the insurance provider. For example, one or more of the non-binding insurance quotations may be used as a basis to provide one or more new quotations (e.g., a "re-quotation") for insurance coverage. In some cases, insurance agents and/or agencies may use the non-binding quotations as a source of leads for generating new business, such as by providing the re-quotation for insurance coverage to previously contacted individuals. In general, a bind rate for such re-quotations is better than a bind rate associated with "cold-calling" prospective insurance customers. For example, a bind rate for leads generated from previously contacted individuals may be greater than 10% (e.g., from about 10% to about 20%, etc.), while cold-calling may result in a bind rate between about 2% to about 5%. Further, by prioritizing the sales leads corresponding to re-quotations, the bind rate may be further improved (e.g., greater than 20%, from about 20% to about 35%, etc.).

In some cases, an insurance provider may desire to generate a list of potential sales based on a record of non-binding insurance quotations. These sales lead lists may be generated manually and/or automatically based on any number of criteria (e.g., time, location, insurance type, etc.). In some cases, the list of potential sales leads may be automatically generated based, at least in part, on regional information (e.g., a city, a state, etc.), quoted insurance coverage information (e.g., vehicle insurance, property insurance, etc.), a time from the initial quotation (e.g., less than 3 months, less than 6 months, about 1 year, etc.), and/or the like. In some cases, the list of sales leads may be generated based on a combination of different factors, such as residency information and/or other demographic information about a potential insurance customer, a desired insurance type, time from an initial quotation, and the like. For example, a list of sales leads may be generated to include individuals who are resident in a particular state, were previously provided a quotation for automobile insurance, and the previous insurance quotation was provided less than 6 months from a current date. Other lists may include individuals associated with any non-binding insurance quotations within a specified time period (e.g., less than 3 months, less than 6 months, etc.) and/or insurance quotations provided to individuals resident in a particular state (e.g., Illinois, Arkansas, West Virginia, etc.). In some cases, a lead list may include up any non-binding insurance quotations within a particular time period, regardless of residence and/or the requested insurance coverage.

After a lead list has been generated based on a number of non-binding quotations, the lead list may be filtered to remove non-contactable leads, such as to produce a filtered lead list. For example, the non-contactable leads may include individuals who prefer not to be contacted with sales and/or marketing solicitations, such as those listed in a "do not call" list. In other cases, filtering may be done to remove individuals who may not be contactable due to one or more different reasons (e.g., a wrong address, a wrong phone number, a deceased individual, etc.). Such filtering may be done using information obtained from publicly available records, such as a phone list, property transfer records, and the like. In some cases, the insurance provider may filter the lead list using information stored locally in a data repository associated with the insurance provider. This may include using information about whether an individual has subsequently purchased insurance coverage from the insurance provider separate from the previously non-binding insurance quotation.

To prepare a new quotation for individuals associated with the lead list, the insurance provider may determine a difference between the first non-binding quotation and a re-quotation that may be sent to a particular individual. For example, the insurance provider may determine that one or more discounts were not previously available or not previously offered to the individual. For each individual associated with the lead list, one or more differences may be found. These differences may be combined or used individually in determining a re-quotation. In some cases, the insurance provider may determine two or more different combinations of discounts and/or insurance coverage amounts that may be used in determining different possible re-quotations that may be sent to an individual. Each of the re-quotations may be evaluated to determine which one of the re-quotations may provide the highest likelihood that the individual may purchase insurance coverage in response to the re-quotation.

After at least one re-quotation has been prepared for each individual associated with the lead list, each of the re-quotations may be evaluated to determine a likelihood that the re-quotation would bind. For example, the insurance provider may use one or more models (e.g., regression models) that may be used to determine a likelihood that a re-quotation will bind based on a relationship between characteristics associated with the re-quotation. In some cases, the insurance provider may evaluate each re-quotation associated with the lead list using a model developed for a particular state. The insurance provider may also use a multi-state model to evaluate the re-quotations associated with the lead list, where the multi-state model may be used in place of, or in addition to, the state model. In some cases, the state models may be developed using regression techniques (e.g., linear regression, ordinary least squares regression, logistic regression, etc.) to evaluate variables associated with the re-quotations in relation to other variables. In some cases, each variable may be weighted using an estimated coefficient, where the coefficients may be estimated using one or more methods such as a maximum likelihood estimation.

In some cases, each state model may have input variables and/or coefficients different than models developed for different states and/or different than the multi-state model. For example, a state regression model developed for Arkansas may be different than a state model developed from Illinois, where both the Arkansas and Illinois models may be different than a multi-state model. In some cases, the multi-state model may be developed using information corresponding to binding and/or non-binding insurance quotations associated with two or more states. In some cases, the multi-state model may be considered a national model and may be used to evaluate re-quotations for two or more different states. In other cases, the multi-state model may be used for a subset of states and different multi-state models may be developed for different groupings of states. For example, an insurance provider may have a Midwest regional model that may be used to evaluate lead lists for use in Midwestern states (e.g., Illinois, Wisconsin, Michigan, Indiana, etc.), a northeastern regional model that may be used to evaluate lead lists for use in northeastern states (e.g., New York, Maine, Massachusetts, New Hampshire, etc.), a southeastern model for use in southeastern states (e.g., Florida, Virginia, Louisiana, Virginia, West Virginia, Arkansas, etc.), a Southwestern model for use in southwestern states (e.g., Arizona, Texas, New Mexico, Oklahoma, etc.), and a western model for use in Western states (e.g., California, Colorado, Wyoming, Washington, etc.), and/or the like.

After each lead in the lead list is evaluated using one or more of the state models and/or the multi-state models, the leads associated with the lead list may be grouped, for example, according to a likelihood that the re-quotation will bind. For example, the models may be configured to output a score corresponding to the likelihood that the re-quotation would bind for each lead included in the lead list. The lead list may then be ordered based, at least in part, on the scores associated with each lead on the lead list, such as to produce a ranked list. In some cases, the leads associated with a particular lead list may be graded based on a range of scores to produce a graded list. In some cases, grades may be associated with a fixed range of scores. For example, leads associated with the lead list may be assigned to grades (e.g., A, B, C, D, F, etc.), where each grade is associated with a range of scores. In an illustrative example, leads having a score greater than 25% may be assigned a grade of A, leads having a score less than or equal to 25% but greater than 20% may be assigned a grade of B, leads having a score less than or equal to 20% but greater than 15% may be assigned a grade of C, leads having a score less than or equal to 15% but greater than 10% may be assigned a grade of D, and leads having a score less than or equal to 10% may be assigned a grade of F. These grades and/or ranges are meant to be illustrative and other groupings and/or ranges may be contemplated. For example, a lead list may be divided in half, where the bottom scoring leads (e.g., bottom 50%) may be assigned a grade of F, and where the top scoring leads (e.g., top 50%) may be divided between two or more different grades (e.g., A, B, C, D, E, etc.).

The scored and/or graded lead lists may be provided for use in a sales and/or marketing campaign. For example, a scored or graded lead list may be provided to a regional office of the insurance provider. In some cases, the lead list may be evaluated at the regional office to determine whether to provide the list, or a portion of the list (e.g., grade A leads, grade A and grade B leads, etc.), to one or more insurance agents and/or agencies. In some cases, the scored and/or graded lead list may be provided to a call center and/or a mail center for use in contacting individuals during a sales and/or marketing campaign. Once received, the leads may be contacted based on an associated grade or score. For example, an insurance agent may contact all the leads assigned an A grade before contacting the leads having a B grade, where the lowest graded leads (e.g., grade F) may be contacted last. Once contacted, information about whether the re-quotations resulted in a sale of insurance coverage may be stored in a data repository at the insurance provider. This information may then be used to adjust the models and/or generate different models to improve the model's ability to evaluate the likelihood of success for re-quotations for insurance coverage. For example, inputs to the models may be added or removed and/or weightings associated with the inputs may be adjusted based on the information of success or failure of the re-quotations in generating sales of insurance coverage.

FIG. 1 illustrates a block diagram of a computing device 101, or a computing system (e.g., a property inspection decision device) in a computer system 100 (e.g., a property inspection system) that may be used according to one or more illustrative embodiments of the disclosure. The computing device 101 may have a processor 103 for controlling overall operation of the computing device 101 and its associated components, including one or more memory units (e.g., a random access memory (RAM) 105, a read only memory (ROM) 107), an input/output module 109, and a memory 115. The computing device 101, along with one or more additional devices (e.g., one or more terminals such as the terminals 141 and 151, hardware comprising a security and integration layer 160) may correspond to any of multiple systems or devices, such as a property inspection system and/or a property inspection decision device configured as described herein for determining an insurability risk score using an adaptable inspection model in response to a request to provide insurance coverage for a property, comparing the insurability risk score to a constraint, and/or ordering an inspection of the property when the insurability risk score does not meet the constraint.

The input/output (I/O) module 109 may include one or more user interfaces, such as a microphone, keypad, touch screen, and/or stylus through which a user of the computing device 101 may provide input, and may also include one or more of a speaker for providing audio output and a video display device for providing textual, audiovisual and/or graphical output. Software may be stored within the memory 115 and/or storage to provide instructions to the processor 103 for enabling the device 101 to perform various actions. For example, the memory 115 may store software used by the device 101, such as an operating system 117, one or more application programs 119, and an associated internal database 121. The various hardware memory units in the memory 115 may include volatile and nonvolatile, removable and non-removable media implemented in any method or technology for storage of information such as computer readable instructions, data structures, program modules or other data. The memory 115 also may include one or more physical persistent memory devices and/or one or more non-persistent memory devices. The memory 115 may include, but is not limited to, the RAM 105, the ROM 107, an electronically erasable programmable read only memory (EEPROM), a flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the processor 103.

The processor 103 may include a single central processing unit (CPU), which may be a single-core or multi-core processor (e.g., dual-core, quad-core, etc.), or may include multiple CPUs. In some cases, the processor 103 may have various bit sizes (e.g., 16-bit, 32-bit, 64-bit, 96-bit, 128-bit, etc.) and various processor speeds (ranging from 100 MHz to 5 Ghz or faster). The processor 103 and its associated components may allow the computer system 100 to execute a series of computer-readable instructions, for example, to determine an insurability risk score using an adaptable inspection model in response to a request to provide insurance coverage for a property, where the adaptable inspection model configured for analyzing a risk associated with providing insurance coverage for the property, compare the insurability risk score to a constraint, and order an inspection of the property when the insurability risk score does not meet the constraint. In some cases, the instructions may be configured to cause the processor 103 to determine a first model risk score corresponding to an insurability risk associated with insuring the property, where the first model risk score determined using a first inspection risk model, determine a second model risk score corresponding to an insurability risk associated with insuring the property, where the second model risk score determined using a second model, and determine the insurability risk score based on the first model risk score and the second model risk score.

The computing device 101 (e.g., a customer terminal, an insurance provider computer hardware memory and processor system, an insurance clearinghouse computer memory and processor device, etc.) may operate in a networked environment (e.g., the computer system 100) supporting connections to one or more remote computers, such as the terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the computing device 101. In some cases, the terminals 141, 151 may be located at one or more different geographic locations, including, but not limited to, at a site associated with an insurance agent and/or agency and/or a site associated with an insurance provider. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the computing device 101 may include a modem 127 or other means for establishing communications over the WAN 129, such as network 131 (e.g., the Internet, a cellular network, and the like). When used in a wireless telecommunications network 133, the computing device 101 may include one or more transceivers, digital signal processors, and additional circuitry and software for communicating with one or more wireless computing devices 141 (e.g., mobile phones, portable customer computing devices) via one or more network devices 135 (e.g., base transceiver stations) in the wireless telecommunications network 133.

Also illustrated in FIG. 1 is a security and integration layer 160, through which communications may be sent and managed between the computing device 101 and the remote devices (e.g., the terminals 141 and 151) and remote networks (e.g., the LAN 125, the WAN 129, and the wireless telecommunications network 133). The security and integration layer 160 may comprise one or more computing devices, such as web servers, authentication servers, and various networking components (e.g., firewalls, routers, gateways, load balancers, etc.), having some or all of the elements described above with respect to the computing device 101. As an example, the security and integration layer 160 may comprise a set of web application servers configured to use secure protocols and to insulate the computing device 101 (e.g., one or more servers, a workstation, etc.) from the external devices (e.g., the terminals 141 and 151). In some cases, the security and integration layer 160 may correspond to a set of dedicated hardware and/or software operating at the same physical location and under the control of same entities as the computing device 101. For example, the security and integration layer 160 may correspond to one or more dedicated web servers and network hardware in a data center or in a cloud infrastructure supporting a cloud-based application and/or process. In other examples, the security and integration layer 160 may correspond to separate hardware and software components which may be operated at a separate physical location and/or by a separate entity.

In some cases, the data transferred to and from the computing device 101 in may include secure and sensitive data, such as insurance customer and policy data. Therefore, it may be desirable to protect the data transmission by using secure network protocols and encryption, and also to protect the integrity of the data stored when on the computing device 101 using the security and integration layer 160 to authenticate users and restrict access to unknown or unauthorized users. In various implementations, the security and integration layer 160 may provide, for example, a file-based integration scheme or a service-based integration scheme. In filed-based integration, data files may be transmitted to and from the computing device 101 through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption.

In service-based integration, one or more web services may be implemented within the computer system 100 between the computing device 101 and/or the security and integration layer 160. The web services may be accessed by authorized external devices and users to support input, extraction, and manipulation of the data in the computing device 101. Web services built to support to the computer system 100 may be cross-domain and/or cross-platform, and may be built for enterprise use. Such web services may be developed in accordance with various web service standards, such as the Web Service Interoperability (WS-I) guidelines. In some examples, system web service may be implemented in the security and integration layer 160 using the Secure Sockets Layer (SSL) or Transport Layer Security (TLS) protocol to provide secure connections between the computing device 101 and various clients, such as the terminals 141 and 151, attempting to access, insert and/or manipulate data within the computer system 100. SSL or TLS may use HTTP or HTTPS to provide authentication and/or confidentiality. In some cases, system web service may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within the memory 115 or other components in the computer system 100, may include one or more caches, for example, CPU caches used by a processing unit (e.g., the processor 103), page caches used by the operating system 117, disk caches of a hard drive, and/or database caches used to cache content from database 121. For embodiments including a CPU cache, the CPU cache may be used by one or more processors (e.g., the processor 103) in the processing unit to reduce memory latency and access time. In such examples, the processor 103 may retrieve data from or write data to the CPU cache rather than reading/writing to the memory 115, which may improve the speed of these operations. In some examples, a database cache may be created in which certain data from a database 121 may be cached in one or more separate smaller databases on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of the computer system 100.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and life insurance clearinghouse system components described herein may be configured to communicate using any of these network protocols or technologies.

Additionally, one or more application programs 119, such as a property inspection determination application, may be used by the computing device 101 within the computer system 100, including computer executable instructions for determining an insurability risk score using an adaptable inspection model in response to a request to provide insurance coverage for a property, the adaptable inspection model configured for analyzing a risk associated with providing insurance coverage for the property, comparing the insurability risk score to a constraint and ordering an inspection of the property when the insurability risk score does not meet the constraint. In some cases, the instructions may cause the computing device 101 to receive a request to provide insurance coverage for a property, determine an insurability risk score corresponding with a risk of providing insurance coverage for the property using an adaptable inspection model, the adaptable inspection model including a first model, a second model, and a control model, wherein the insurability risk score is computed using a weighted output of the first model and a weighted output of the second model, order an inspection of the property when the control model randomly selects the property for inspection or when the insurability risk score does not meet a specified constraint, and report, via the user interface, whether or not the property is to be inspected.

Figure 2:
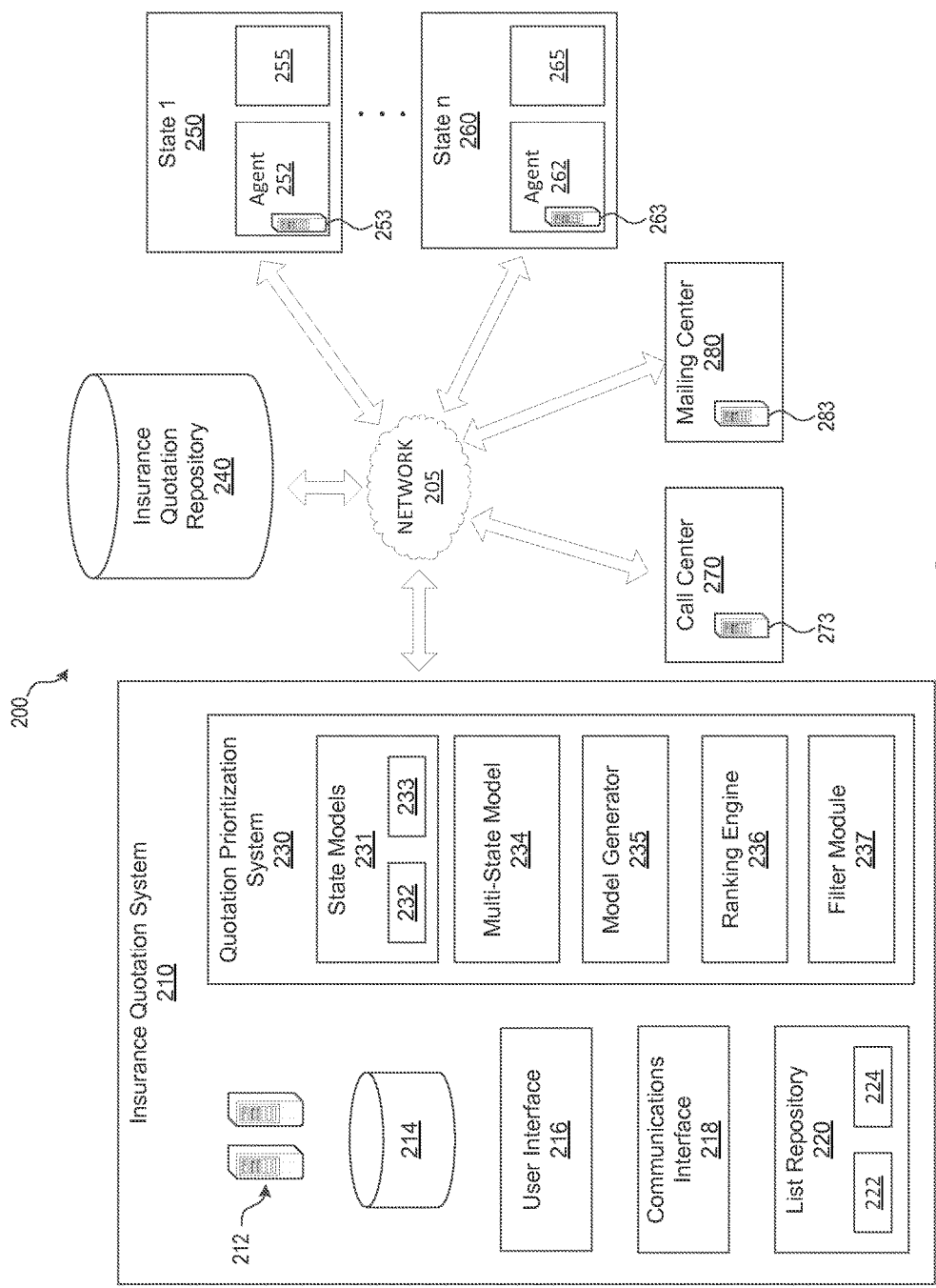
FIG. 2 is a diagram illustrating various components of an illustrative insurance quotation system, according to one or more aspects of the disclosure.

FIG. 2 is a diagram illustrating various components of an illustrative insurance coverage system 200, according to one or more aspects of the disclosure. In an example, the insurance coverage system 200 may include an insurance quotation system 210 having a quotation prioritization system 230, where the quotation priority system may be communicatively coupled to a computing device 253, 263, 273, 283 associated with an insurance agent and/or agency in one or more states 250, 260, a call center 270 and/or a mailing center 280 via a network 205 (e.g., the Internet, a telecommunications network, a LAN, a WAN, etc.). In some cases, an insurance agent 252 in a first state 250 and an insurance agent 262 in a second state 260 may be associated with the insurance provider associated with the insurance quotation system 210. Further, the insurance quotation system 210 may include one or more computing devices 212, a data repository 214, a user interface 216, a communications interface 218 and/or a data repository for storing insurance leads (e.g., a list repository 220). In some cases, the insurance quotation system 210 may be communicatively coupled to an insurance quotation repository 240, where the insurance quotation repository 240 may include historical information about one or more binding and/or non-binding insurance quotations.

In some cases, the quotation prioritization system 230 may include one or more state models 231, one or more multi-state models, such as the multi-state model 234, a model generator 235, a ranking engine 236 for ranking leads associated with one or more lead lists 222, 224, and/or a filter 237 for filtering leads associated with the lead lists 222, 224. In some cases, one or more of the model generator 235, the ranking engine 236, and/or the filter 237 may be may be implemented using the one or more computing devices 212 that may be executing instructions stored in the data repository 214. The quotation prioritization system 230 may be communicatively coupled to and/or include one or more data repositories for storing historical information associated with one or more insurance quotations, such as the list repository 220 and/or the insurance quotation repository 240. In some cases, the insurance quotation repository 240 may include information corresponding to one or more insurance quotations provided to potential insurance customers. For example, the insurance quotation repository 240 may include identifying information about different insurance quotations (e.g., a control number, a quotation number, a quotation generation date, a quotation delivery date, a response date, etc.), information about a requested insurance coverage (e.g., an insurance type, a coverage state, a coverage amount, coverage limits, etc.), discount information (e.g., a multi-policy discount, an automatic payment discount, etc.) and/or information about the insurance customer (e.g., a name, an address, a phone number, demographics information, etc.). In some cases, the insurance quotation repository 240 may include an indication about whether a particular insurance quotation was binding (e.g., resulted in a sale of insurance coverage), or was non-binding (e.g., did not result in a sale of insurance coverage).

In an illustrative example, insurance consumers may request insurance coverage, or a quotation for insurance coverage from an insurance provider. Each consumer may contact the insurance agent and/or agency 252, 262 and/or a call center 270 for an insurance quotation using one or more methods, such as via a phone call, an email, an internet-based form, an in-person consultation, and/or the like. In some cases, the insurance consumer may request an insurance quotation over the Internet via a web interface (e.g., a web page) directly an insurance provider and/or via a web page associated with an insurance agent or agency 252, 262. For example, the insurance consumer may request insurance coverage for one or more vehicles. In response to the request the insurance agent and/or insurance agency 252, 262 may enter information about the insurance consumer and/or the vehicle to be insured into an insurance quotation system using one or more computing devices (e.g., a tablet computer, a laptop computer, a desktop computer, a smart phone, etc.). The insurance quotation system 210 may include software executed locally on the one or more computing devices 212 and/or software running at an external location and accessed via a browser application (e.g., a web browser). For example, the insurance agent and/or agency 252, 262 may enter information about the insurance customer (e.g., name, age, income information, employment information, credit information, etc.) and/or the vehicle (e.g., age information, value information, mileage information, geographical location information, etc.) into the insurance quotation system 210, which may be stored locally in the data repository 214 and/or remotely in the insurance quotation repository 240.

In some cases, the insurance quotation system 210 may be used for providing quotations for one or more different insurance types, such as vehicle insurance, property insurance, rental insurance, health insurance, business insurance, life insurance, recreational vehicle insurance, and/or the like. For example, the insurance consumer may request insurance coverage for one or more properties, such as a home, multi-dwelling building, a unit in a multi-dwelling building and/or a commercial property. In response to the request, the insurance agent and/or insurance agency 252, 262 may enter information about the insurance consumer and/or the property to be insured (e.g., a house) into an insurance quotation system 210 using a computing device (e.g., a tablet computer, a laptop computer, a desktop computer, a smart phone, etc.). The insurance quotation system 210 may include software executed locally on the computing device and/or software running at an external location and accessed via a browser application (e.g., a web browser). For example, the insurance agent and/or agency 252, 262 may enter information about the insurance customer (e.g., name, age, income information, employment information, credit information, etc.) and/or the property (e.g., age information, value information, geographical location information, hazard information, etc.) into the insurance quotation system 210.

Over time, one or more of the insurance quotations may bind and, as such, result in the insurance provider providing requested insurance coverage to the insurance customer. However, not all insurance quotations will bind. The insurance provider may store information in the insurance quotation data repository 240 corresponding to the insurance quotations including an indication whether each quotation was binding. The non-binding quotations may be used as a resource for generating potential sales leads. For example, insurance agents 252, 262 may desire to provide a re-quotation to previously contacted individuals that declined to purchase insurance coverage. In some cases, the insurance quotation system 210 may be configured to generate a lead list 222 using information stored in the insurance quotation repository 240. For example, the lead list 222 may be generated based on non-binding insurance quotations. In some cases, each lead list 222 may correspond to a geographic area. For example, the lead list 222 may be generated based on non-binding quotations associated with individuals located near a city, a county, or within a state. In some cases, the lead list 222 may be generated based on non-binding insurance quotations generated by an insurance agent or agency within a particular geographic region (e.g., a city, a county, a state, etc.). In some cases, the lead list 222 may be generated based on a time (e.g., a quotation time, a time of last contact with the individual, etc.) associated with the one or more non-binding insurance quotations. For example, the lead list 222 may be generated using non-binding insurance quotations that were communicated within a time period (e.g., about 3 months, about 6 months). In some cases, older non-binding insurance quotations may not generate leads as useful as more recent non-binding insurance quotations. However, some older non-binding insurance quotations may be useful, such as those at about 11 months, about 12 months, or other time intervals that may correspond to an end of an insurance coverage term.

In an example, a customer may receive an initial quotation for insurance coverage, but decide to purchase insurance coverage from a different provider. In some cases, the insurance provider may infer, or otherwise obtain, information about the end of the coverage term for the purchased insurance coverage. Near the end of the coverage term, or otherwise approaching a renewal date of the purchased insurance coverage, the insurance consumer may be more receptive to a new insurance quotation than at other times (e.g., shortly after renewing insurance coverage). As such, a re-quotation provided to a prospective insurance consumer may have a greater likelihood of binding when provided close to the end date of a current insurance coverage term.

In some cases, each lead on the lead list may include identifying information about the initial quotation and/or an individual associated with the initial quotation. For example, an entry on the lead list may include a quotation number, a control number, a first name, a last name, a phone number, and/or an address. In some cases, this information may be used by the quotation prioritization system 230 to retrieve further information about the previous quotation (e.g., coverage amounts, available discounts, offered discounts, etc.) and/or further information about the individual (e.g., demographic information, whether credit a credit history was ordered, etc.). For example, the quotation prioritization system 230 may retrieve such information for use when determining a likelihood that the insurance quotation may bind using the regression model.

In some cases, the quotation prioritization system 230 may receive an insurance lead list from an external source. For example, a user may input a list via a user device (e.g., a key pad, a touch screen device, etc.), upload a list via a communication interface (e.g., a USB port, a serial port, an Ethernet port, etc.) and/or the like. In some cases, the quotation prioritization system 230 may be configured to automatically generate a lead list in response to a user request, such as a user input received via a user interface device associated with the user interface 216. For example, in response to a user input, the insurance quotation system 210 may query the insurance quotation data repository 240 for information about one or more previously non-binding insurance quotations. The insurance quotation system 210 may then generate a lead list using the received information. In some cases, the quotation prioritization system 230 may be configured to request a lead list at specified intervals (e.g., weekly, biweekly, monthly, etc.) In such cases, the quotation prioritization system 230 may retrieve two or more previously non-binding quotations from the insurance quotation system 210 via the network upon expiration of the time interval. Once received, the insurance quotation system 210 may generate a lead list based on the retrieved non-binding insurance quotations.

Once generated, insurance lead lists, such as lead list 222 may be filtered to remove less viable leads. For example, the insurance quotation system 210 may be configured to process one or more lead lists stored in the list repository 220 (e.g., a lead repository) using the filter 237. The filter 237 may be configured to process (e.g., evaluate) each of the leads included in the lead list 222 according to specified criteria based on one or more characteristics of the lead, such as a name, an address, a phone number, and the like. In some cases, the filter 237 may compare information about individuals associated with the leads against a "do-not-call" list. For example, the filter 237 may be configured to determine whether an individual is included on the do-not-call list, such as by searching for the individual's name, address and/or phone number within the do-not-call list. In some cases, the filter 237 may be configured to determine whether a name, an address and/or a phone number of associated with a lead is accurate, such as by searching publicly available records, such as birth records, death notices, property transaction records, telephone directories, and/or the like. If necessary, the filter 237 may remove the individual, and the associated quotation information, from the lead list. For example, a search may indicate that an individual is listed on a do-not-call list, has moved from a previously saved address, no longer has a same phone number, and/or has died. In such cases, the filter 237 may remove one or more leads from the lead list 222 when generating the filtered lead list 224. In other cases, the filter 237 may flag, or otherwise indicate, that a lead should be removed and/or further investigated for accuracy.

In some cases, the quotation prioritization system 230 may be configured to evaluate a list of leads, such as the filtered lead list 224 and/or the lead list 222, using one or more models (e.g., the state models 231, a multi-state model 234, etc.). For example, the quotation prioritization system may be configured to generate one or more of the state models 231 and/or the multi-state model 234 using a model generator 235. The model generator may be configured to analyze historical information associated with a plurality of insurance quotations, such as the information stored in the insurance quotation repository 240, to determine a model useful in predicting a likelihood that a sales lead and/or a quotation provided to the sales lead may result in a sale of insurance coverage. In some cases, the model generator 235 may be configured to generate one or more models based on regression analysis. For example, the model generator may be configured to generate a first state model 232 based on a regression analysis of information stored in the insurance quotation repository 240. In some cases, one or more of the state models 231 and/or one or more multi-state model 234 may be generated using linear regression analysis, logistic regression analysis (e.g., ordinal, nominal, etc.), multiple regression analysis, stepwise regression analysis, partial least squares regression analysis, non-linear regression analysis, and/or the like. In some cases, the model generator may determine a different set of inputs and/or weightings (e.g., coefficients) for each of the plurality of models, such as the state models 231, 232, 233, 234.

The quotation prioritization system 230 may then use one or more of the models 231, 232, 233, 234 to determine a likelihood for each sales lead in a list of sales leads, such as the filtered lead list 224, may bind. In some cases, the quotation prioritization system 230 may receive the lead list from one or more sources, such as a data repository (e.g., the list repository 220). In some cases, a user may provide a lead list to the quotation prioritization system 23 via a user interface 216, where the user may enter one or more sales leads using a user interface device, such as a key pad, a touch screen, and/or the like. In some cases, a user may select a list (e.g., the list 222, the list 224, etc.) to be loaded into the quality prioritization system, where the list may be stored locally to the insurance quotation system 210, may be retrieved from an external storage device such as a hard drive, a compact disc (CD) ROM, a digital video disc (DVD), a flash memory device, and/or the like. In some cases, the user may access these devices via a communications interface 218, such as an input/output interface (e.g., a Bluetooth network, a USB network, a serial connection, etc.). In some cases, the user may retrieve a list stored on a different computing device via a communications interface 218. For example, the user may select a list stored on a remote computing device to be retrieved via the communications interface 218 over a network, such as a LAN, a WAN, the Internet, a telecommunications network, and/or the like.

In some cases, a geographic area and/or region may be associated with a lead list. For example, a lead list may be generated and/or evaluated to determine whether the lead list is associated with a particular geographic area, such as a city, a county, a state, a multi-state region, and the like. This geographic area may be used to determine which regional office, call center and/or insurance agent and/or agency the lead list is to be sent. For example, a lead list generated to include sales leads associated with a first state 250 may ultimately be sent to a regional office and/or an insurance agent or agency 252 associated with the first state 250, while a list including sales leads associated with a second state 260 may ultimately be sent a regional office and/or an insurance agent 262 associated with the second state. In some cases, a lead list may be generated using leads corresponding to a larger geographic area, such as a multi-state region or a national region. In such cases, the lead list 224 may be set to a call center associated with two or more states and/or two or more regional offices associated with the two or more states 250, 260.

The geographical region associated with a the sales lead list 222, 224 may be used to select one or more models for use in evaluating a likelihood that a re-quotation will bind if presented to the associated individual. In some cases, the insurance provider may determine that a first state 250 may assign a likelihood that a lead will bind using one or more state models 231 and/or a multi-state model. In some cases, the state models 232, 233 may each be developed for evaluating lead lists for individual states 250, 260. In other cases, one or more models may be developed for a geographic region including two or more states. For example, a model may be developed for a region including two or more states (e.g., the Midwest states, the Western states, the Northeastern states, etc.). In some cases, two or more models may be used to evaluate a same lead list 224. In such cases, a policy may be used for determining which model may be used. For example, an insurance provider may determine that a single state model may be used to evaluate lead lists for one or more states (e.g., Illinois, West Virginia, etc.). In other cases, a multistate model (e.g., a national model, a regional model, etc.) may be used to evaluate lead lists associated with one or more states. In some cases, a model preference may be specified in a configuration file and/or set by a user. In some cases, models may be assigned to a lead list based on information associated with the list. For example, a rule may be defined that a national model may be used to evaluate lead lists associated with a plurality of states. However, a user may be able to specify that a different state model may be used instead. In some cases, a lead list may be evaluated using a state model 232 and a multi-state model 234 to determine which model provides a better ranking for the leads included in the lead list.

The models may be configured to evaluate each lead included in the lead lists 222, 224. For example, each of the models may be configured to process information associated with each of the leads using a plurality of inputs, process the information using a number of weighting factors (e.g., coefficients) using one or more equations, and output a score corresponding to a likelihood that a re-quotation associated with the lead would result in a sale of insurance coverage, or would otherwise bind. During the evaluation process, the insurance quotation system 210 may retrieve information from a data repository, such as the insurance quotation repository 240 and/or the data repository 214, corresponding to each individual lead based on identifying information associated with the lead. For example, the leads on the lead list 224 may include a control number, a quotation number, a name, an address, a phone number, or other identifying information that may be used to retrieve information to be used as inputs for a particular model 232, 233, 234. Once retrieved, the quotation prioritization system 230 may process the information using the models and output a score that corresponds to a likelihood (e.g., probability) that a re-quotation may bind (e.g., result in a sale of insurance coverage). The quotation prioritization system 230 may individually evaluate each lead included on the lead list until each lead on the list has been scored.

FIGS. 6 and 7 show illustrative inputs and associated weightings that may be used by illustrative models. For example, FIG. 6 shows a table 600 including inputs 610 and weightings (e.g., the estimate column 620) that may be used for an illustrative state regression model for prioritizing a plurality of insurance leads, according to one or more aspects of the disclosure. Similarly, FIG. 7 shows a table 700 including inputs (e.g., the parameters listed in column 710) and weightings and/or coefficients (e.g., the estimates in column 720) that may be used for an illustrative multi-state model for prioritizing a plurality of insurance leads, according to one or more aspects of the disclosure. In some cases, the weightings defined in columns 620 and 720 may be defined individually for each state model. For example, a first set of weighting coefficients may be defined for a first model associated with the first state 250 and a second set of weighting coefficients may be defined for a second model associated with the second state 260, even if the first model and the second model include substantially similar parameter sets. In some cases, the models (e.g., the state models 231 and/or one or more multi-state model 234) may be developed specifically for determining a likelihood that a re-quotation may bind. In other cases, the models (e.g., the state models 231 and/or one or more multi-state model 234) may be used for both new business leads and for re-quotations of previously non-binding quotations.

In FIG. 6, illustrative inputs used by a state regression model for predicting a likelihood that a re-quotation for vehicle insurance coverage would bind may include a premium per vehicle parameter, a multi-vehicle policy parameter, a single vehicle policy parameter, a number of credit order parameter, a parameter corresponding to no-credit hits for a consumer, an operator age parameter, a number of operators parameter, a parameter corresponding to an agent quotation, and/or an order channel parameter (e.g., online, in-person, telephone, etc.), and/or the like. As shown in table 700, a multi-state regression model may include, an existing customer parameter (e.g., the individual was a customer at the time of the initial quotation), a premium parameter, a premium per item parameter, a parameter corresponding to a time from the initial quotation, a phone contact parameter, an online contact parameter, an insurance score parameter, one or more discount parameters, a single item per policy parameter, one or more multiple item per policy parameters, a location parameter (e.g., a state, a city, a county), and/or the like. In some cases, the tables 600, 700 may define an intercept for use when calculating predicted values.

After each lead on the lead list (e.g., the filtered lead list 224) has been scored, the ranking engine 236 may be used to rank each lead on the list based on the score. For example, the ranking engine 236 may be configured to sort the ranked list based on the scores output by the model. In some cases, an unranked lead list may be provided to a regional office for sorting. The ranked list may be used by one or more business units associated with the insurance provider for contacting potential insurance customers. For example, a lead list may be used by a call center and/or a mailing center for use in a sales and/or marketing campaign. In other cases, the lead list may be provided to a regional office that may coordinate lead distribution to one or more insurance agents and/or agencies within the region served by the regional office. In some cases, a ranked list may include information associated with two or more different regions. As such, this ranked list may be provided to the call center 270 (e.g., a national call center, a regional call center, etc.) when the call center 270 is responsible for contacting sales leads in two or more different states.

In some cases, the ranked lead list may be further sorted to provide further guidance on which leads may have a greater likelihood of resulting in a binding re-quotation for insurance coverage. For example, a score output by the models 231-234 may not have much meaning to an insurance agent 252, 262 and/or a member of the call center 270 or mailing center 280. In such cases, the leads in the ranked lead list may be grouped and/or graded based on the individual lead scores to provide further guidance. For example, the ranking engine 236 and/or one or more regional offices may determine a grade to assign to each of the leads on the list before providing the list to the different business units for contact. For example, leads may be assigned a grade (e.g., 'A', 'B', 'C', 'D', 'E', 'F', etc.) and/or a number ranking (e.g., 1, 2, 3, 4, etc.) to better illustrate which lead may have a greater likelihood for success. For example, a lead list may be divided equally among different grades (e.g., 'A', 'B', 'C', 'D', 'F'), where a top 20% of the list may be assigned an 'A' grade, a next 20% of the ranked list may be assigned a grade of 'B', until the lowest 20% of the list may be assigned a grade of 'F'. For example, a top 50% of the leads in a ranked list may be divided between different grades (e.g., 'A', 'B', 'C', 'D', etc.), and the bottom 50% of the ranked list may be given a grade of 'F'. These groupings are meant to be illustrative and not limiting in a as other grading schemes may also be contemplated.

This graded list (e.g., a first list 255, a second list 265) may be provided to the insurance agent and/or agency 252, 262 for use in a sales or marketing campaign. For example, a regional office may determine which insurance agent and/or agency 252, 262 may be assigned at least a portion of the ranked list. For example, a first list 255 may be provided to a first agent and/or agency 252 and a second list 265 may be provided to a second agent and/or agency 262. In some cases, a list may be assigned to a particular agent and/or agency 252, 262 based on a number of criteria, such as an agency that contacted the potential insurance consumer with the first non-binding lead, a geographical area common to both the sales leads and the insurance agent/and or agency, a capacity of the insurance agent and/or agency to contact an number of leads, and/or the like. In some cases, a first list 255 may contain leads graded from 'A' to 'F' and may be provided to an insurance agent and/or agency 252. In such cases, the leads having an 'A' grade may all be contacted before the leads having a 'B' grade, until the lowest graded leads (e.g., grade 'F') are contacted last. In some case, only a partial lead list may be provided to the insurance agent and/or agency 252, 262. For example, only leads having a grade of 'A' and 'B' may first be provided for providing re-quotations for insurance coverage. When, and/or if, the insurance agent and/or agency 252, 262 has further capacity, they may receive further leads (e.g., grade 'C', etc.).

In some cases, the insurance agent and/or agency 252, 262, the call center 270, and/or the mailing center 280 may coordinate contact of the insurance leads, where a mail campaign that may be used to target potential sales leads in conjunction with a calling campaign done by the call center 270 and/or the insurance agent and/or agencies 252, 262. For example, a mail center may send a mailing to one or more leads on a lead list 224 providing at least a partial re-quotation for insurance coverage to the individuals associated with the leads. After the mailing (e.g., a week, two weeks), the call center 270 and/or the insurance agent and/or agency 252, 262 may contact the same leads to follow up with the initial re-quotation provided in the mailing and, in some cases, to provide further re-quotations for insurance coverage. After providing the a re-quotation to the sales leads on the lead lists, the insurance agent and/or agencies 252, 262, the call center 270, and/or the mailing center 280 may enter further information about the re-quotation provided to the sales leads into the insurance quotation repository 240 using the computing devices 253, 263, 273, 283 via the network 205. In some cases, this information may include information about the re-quoted insurance coverage, demographic information about the individuals, any discounts offered and/or available to the individual, and/or the like. This information may then be used to modify and/or adjust one or more of the state models 231 and at least one multi-state model 234, such as by the model generator 235.

Figure 3:
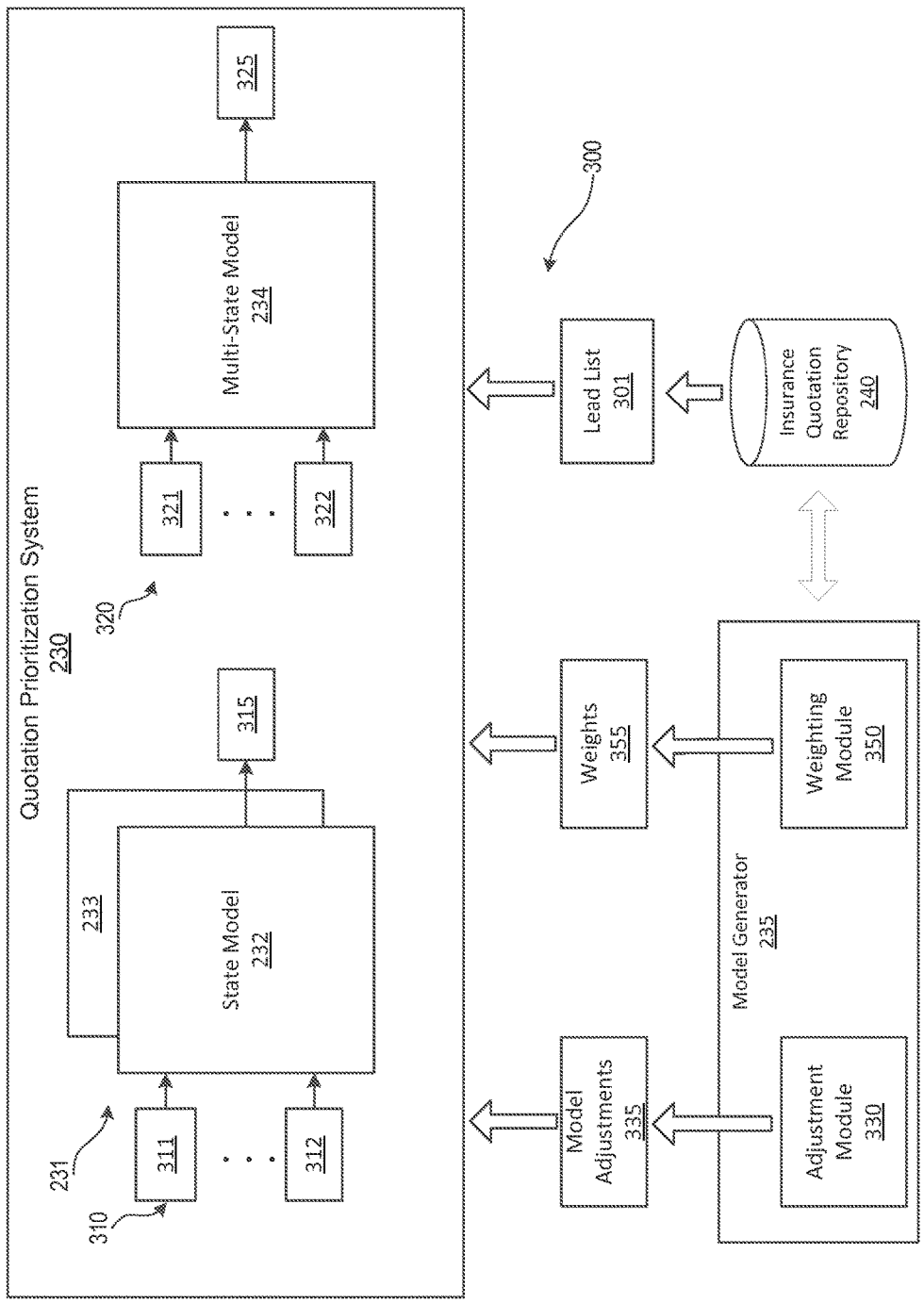
FIG. 3 shows a block diagram representation of illustrative devices for prioritizing insurance leads, according to one or more aspects of the disclosure.

FIG. 3 shows a block diagram representation of illustrative devices within a model generation system 300 for prioritizing insurance leads, according to one or more aspects of the disclosure. As mentioned above, a lead list for contacting individuals (e.g., sales leads) for a re-quotation of insurance coverage may be generated using information about previously non-binding insurance quotations stored in the insurance quotation repository 240. The leads may include references to the insurance quotations to retrieve further information about the previously provided insurance quotation and/or about the individual who received to nonbinding insurance quotation. For example, each sales lead may include one or more of a quotation number, a control number, a first name, a last name, an address (e.g., a mailing address, an email address), a phone number, and/or the like. this identifying information may be used to retrieve information from the insurance quotation repository 240 to be used in defining inputs 310, 320 into the one or more state models 231 and at least one multi-state model 234. For example, this information may include policy information (e.g., a quoted insurance coverage amount, a number of covered vehicles, etc.), discount information (e.g., an existing customer discount, a multi-policy discount, a multi-vehicle discount, an early action discount, an auto-pay discount, etc.), personal information (e.g., a credit history, a number of requests of a credit history, residence information, an age, etc.), and/or the like.

In some cases, the model generator 235 may be configured to develop one or more of the state models 231 and/or at least one multi-state model. For example, the model generator may be configured to use regression analysis using quotation information stored in the insurance quotation repository 240. For example, the model generator may use at least one of linear regression analysis, non-linear regression analysis, logistic regression analysis, Bayesian linear regression analysis, non-parametric regression analysis, and/or the like.

For example, logistic regression may be used to predict a discrete outcome, such as a likelihood that a re-quotation may bind, based on a set of variables that may be continuous, discrete, dichotomous, or a mix of those. In some cases, a result obtained from a logistic regression model may be obtained using the formula:

$$P = \frac{e^{(a+\sum_{i=1}^{n} b_i X_i)}}{1 + e^{(a+\sum_{i=1}^{n} b_i X_i)}}$$

where,
P is the likelihood that the re-quotation may bind;
a is a constant (e.g., the intercept);
b is a coefficient of the predictor variable; and
X is a predictor variable.

In an illustrative example, FIG. 6 describes a constant (a) (e.g., the intercept=1.168) and coefficients (b) (e.g., the estimate column 620) for one or more variables (X), such as the parameters listed in the parameter column 610, that have been defined for an illustrative logistic regression model for a state. Similarly, FIG. 7 describes a constant (a) (e.g., the intercept $\alpha_1$, $\omega_1$, etc.) and coefficients (b) (e.g., the estimate column 720) for one or more variables (X), such as the parameters listed in the parameter column 710 that have been defined for an illustrative logistic regression multi-state model.

A goal of logistic may be to predict an outcome for individual cases (e.g., a sales lead) using the most accurate model. To do this, a model may be created that includes predictor variables that are useful in predicting the probability that a re-quotation provided to an individual associated with a particular sales lead may bind. In developing the mode, different options may be created. In some cases, the variable may be entered into the model in an order specified by an operator, and/or a computing device may automatically test a fit of the model after each coefficient is added and/or deleted, such as by using stepwise regression. Stepwise regression and/or backward stepwise regression may be used during exploratory analysis when testing relationships between variables that may be included in the model. In some cases, a fit of the model may be tested after each variable is added and/or eliminated to ensure that the model may still adequately fit the data. If no more variables can be eliminated from the model, such as during backward stepwise regression, analysis has been completed. Logistic regression may be used to predict a probability of success or failure, the results may be presented as an odds ratio that reflects a relationship and/or the effects of each variable on the outcome, which may be indicated by a value of the coefficient. Coefficients may be tested based on several different techniques, such as by using a Wald test, a Likelihood-Ratio test, a goodness of fit test (e.g., a Hosmer-Lemshow test), and/or the like.

In an illustrative example, the model generator 235 may be configured to develop one or more models using regression analysis of information stored in the insurance quotation repository 240. For example, the model generator may use univariate analysis to identify one or more covariates that may be, at least partially, associated with a response. For example, the model generator may evaluate covariates (e.g., the parameters in Tables 6 and 7) individually to determine whether one or more input variables may be combined. In some cases, a response generated by each input variable may be plotted to determine a scaling (e.g., a weighting coefficient) that may be applied to appropriately scale the variable. In some cases, each input variable may be evaluated and appropriate input variables may be selected using a criteria, such as having a p-value less than or equal to 0.25, along with any other input variable know to have importance (e.g., a state of residence, an available discount, etc.).

In a second step, the model generator 235 may fit a multiple regression model using the variables selected in the first step. In such cases, coefficients associated with the input variables of the multivariate model may be compared to the coefficients associated with the same input variables of the single input model of step 1. In doing so, the importance of each input variable may be determined, such as by using a Wald statistic. If, upon inspection, a variable does not appear important and/or fit the new model, compare the results from the multivariate model to the single variable model. If the differences are not significant, that variable may be removed from consideration. This process may be repeated until at least most of the variables included in the model appear to be significant. In some cases, additional variables not selected in the single variable model may be evaluated in the multiple-variable model. By doing so, one or more confounding variables may be identified. If found, the multiple-variable model may be modified accordingly. In some cases, this multiple-variable model may be termed a preliminary main effects model, which includes variables important in determining a likelihood that a re-quotation of insurance coverage may bind.

As a next step, a main effects model may be determined. This main effects model may be determined by checking an assumption of linearity in logit for each of the continuous covariate. For example, a smoothed plot of the single variable model may be compared against the covariate. If this comparison does not appear linear, a suitable transformation of the covariate may be found so that the logit is roughly linear in the new variable. Such transformations may include powers, log, and/or the like. In some cases, a fractional polynomial method may be used.

After the main effects model is determined, one or more interactions between variables may be determined. For example, one or more variables in the main effects model may have a scientific basis for interaction (e.g., an internet contact variable, a phone contact variable, etc.). In some cases, the interacting variables may be paired, so that an interaction may be evaluated, such as by using a likelihood ratio test. In doing so, any significant interaction between variable may be identified. If found, these interactions may be included in the main effect model and the resulting fit may be evaluated. For example, Wald tests and/or likelihood ratios may be evaluated for the interacting terms. If any interaction is found to be not significant, the interaction may be excluded from the main effects model. This model may then be considered to be a preliminary final model where the overall model may be evaluated, such as by using information stored in the insurance quotation repository 240 and/or using feedback received from re-quotations for insurance coverage provided to individuals selected using the preliminary model and/or re-quotations for insurance coverage provided to individuals selected from a control group not selected using the model.

In another example, an automated stepwise selection process may be performed to develop one or more of the models 231, 234. For example, the process may start with a list of covariates obtained using a univariate analysis, such as the one discussed above. Next, a forward selection process may be performed. For example, a simple model may be used as a starting point, where inputs may be added sequentially until additional inputs do not significantly improve the fit. In some cases, a backward elimination process may be performed such that a complex model may be used as a starting point, where inputs may be removed until a deletion leads to a significantly poorer fit. In general a backward selection process may lead to more accurate results than a forward selection process.

In some cases, the state models 231 and/or the multi-state model 234 may be examined, such as by the model generation system 300, to determine whether the results output from the model fit the data, or whether any residual dispersion (e.g., over dispersion, under dispersion). In some cases, re-quotation information may be used to adjust one or more of the models 231-234. For example, the model generator 235 may obtain or otherwise retrieve re-quotation information from the insurance quotation repository 240 via the network 205. In some cases, the model generator 235 may process the re-quotation information, such as by performing one or more goodness of fit tests (e.g., Pearson's chi-squared test, a likelihood ratio test, etc.) that may be used for the evaluation. In some cases, the output of the tests may provide a chi-square value and/or an associated degree of freedom. In some cases, if the chi-square value is less than the respective degree of freedom ((chi-square value)/(degree of freedom)<1), then a potential under-dispersion may exist. Similarly if the chi-square value is greater than the respective degree of freedom ((chi-square value)/(degree of freedom)>1), then a potential over-dispersion may exist. When a chi-square/degree of freedom ratio is 1, then the model may fit the data. In some cases, one or more assumptions may be tested, such as an assumption of linearity for one or more continuous variables.

In other cases, one or more observations may be examined to determine whether an outlier exists, or whether a variable may exert any undue influence on the model results. In such cases, one or more software tools may be used during this evaluation process. As a result of the tests, the model generator 235 may generate one or more model adjustments 335 and/or weights 355 that may be communicated to the quotation prioritization system 230, such as to adjust the models 231-214. For example, the model adjustments may include adding and/or removing input variables of the different models 231-234. In other cases, the weights 355 may include one or more adjustments to the weighting coefficients of the models 231-234. Following the adjustments, the outputs of the models 315, 325 may be further examined by the model generator 235, such as by performing another goodness of fit test, to determine whether the adjustment improved the performance of the model 231-234.

Figure 4:
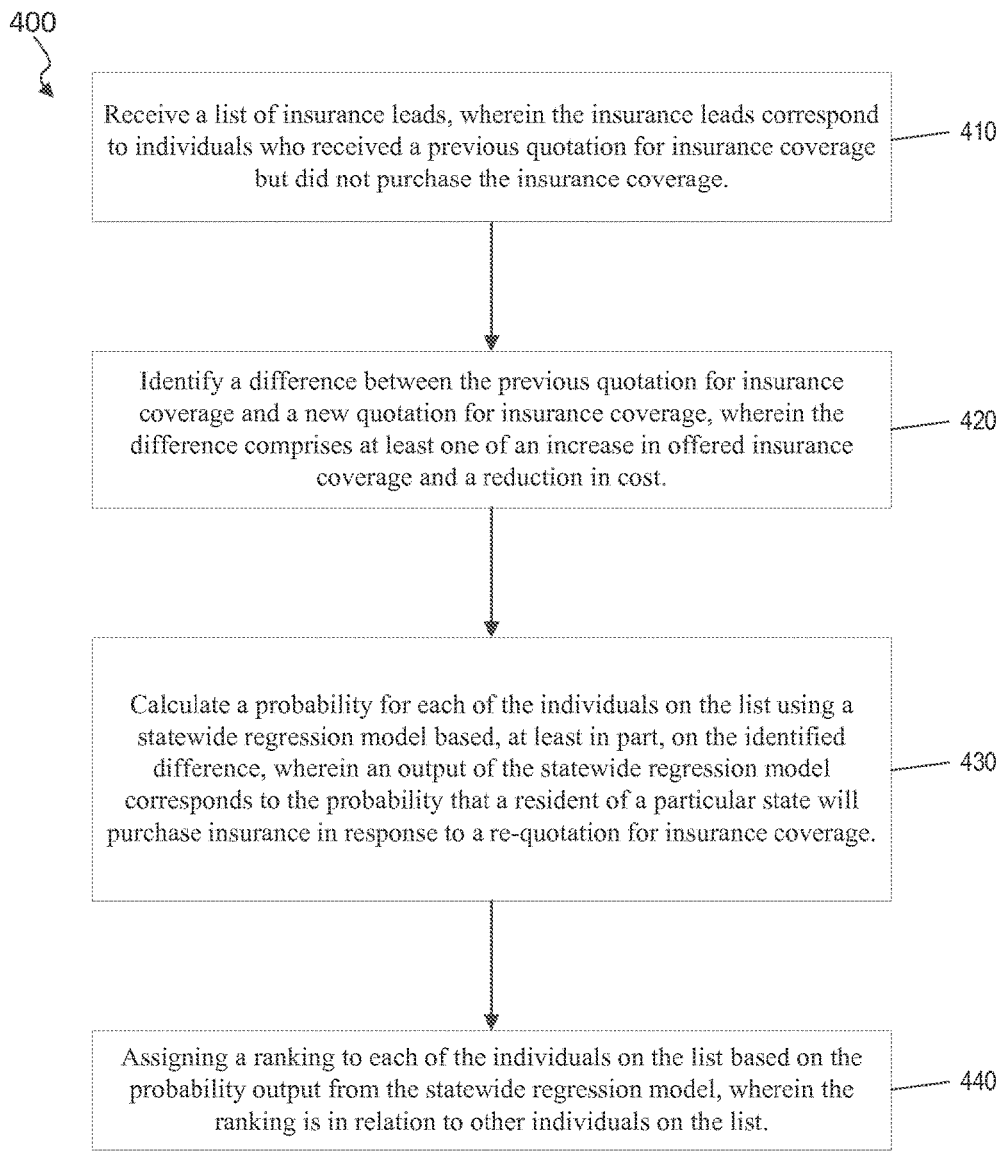
FIGS. 4 and 5 show illustrative methods for prioritizing insurance leads, according to one or more aspects of the disclosure.
Figure 5:
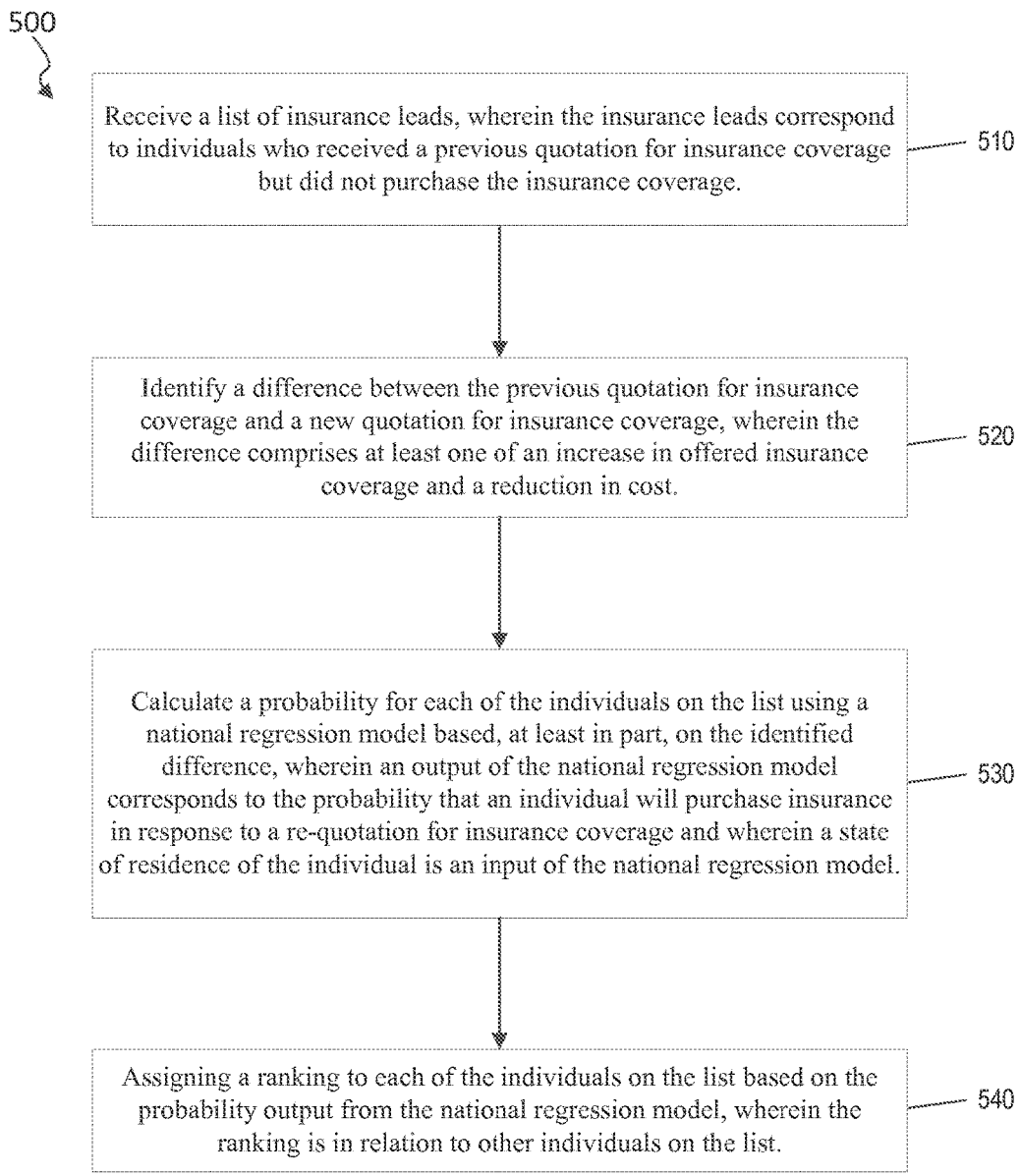

FIGS. 4 and 5 show illustrative methods 400, 500 for prioritizing insurance leads, according to one or more aspects of the disclosure. In some cases, at 410, at least one computing device (e.g., the computing devices 212) may receive a list of insurance leads, such as from the insurance quotation repository 240. In some cases, the insurance leads may correspond to a plurality of non-binding insurance quotations provided to individuals that did not purchase insurance coverage. In some cases, the previously unfilled quotations may be used as a basis of a lead list for providing re-quotations for insurance coverage to the individuals associated with the previously unfilled leads. For example, information associated with the unfilled leads may include at least one of a quotation identifier, a name, an address, and a phone number.

At 420, a difference between the unfilled insurance quotation and a re-quotation may be identified. For example, the difference between the unfilled quotation and the re-quotation may include a reduction in cost and/or an increase in coverage amounts. In some cases, the difference may include a discount previously not offered to the individual, and/or a discount newly available to be offered. At 430, the one or more computing devices 212 may calculate a probability for each of the leads (e.g., individuals) associated with the lead list, where the probability corresponds to the likelihood that the individual receiving the re-quotation will purchase insurance coverage as a result of the re-quotation. In some cases, the likelihood may be computed using a model (e.g., a linear regression model, a logistic regression model, etc.) associated with a state of residence of the individual. For example, the first state model 232 may be used for determining a likelihood that an individual resident of a first state may purchase insurance coverage as a result of the re-quotation and the second state model 233 may be used for determining a likelihood that an individual resident of a different second state may purchase insurance coverage after receiving a re-quotation for insurance coverage. In some cases, identifying information associated with each lead (e.g., a quotation number, a control number, a name, an address, a phone number) may be used to obtain details of an earlier provided quotation from the insurance quotation repository 240. This information may be used to determine differences between the non-binding quotation and a new re-quotation. In some cases, the information about the new and/or old insurance quotation may be used as inputs into the state regression model when determining a likelihood of At 440, the computing device may assign a ranking to each of the leads on the lead list based on the probability output from the state regression model 232, 233. The ranking may be determined in relation to the other leads on the lead list. In some cases, a highest ranking entry on the lead list may correspond to a highest likelihood that lead may result in a sale of insurance coverage and a lowest ranked entry on the lead list may correspond to the lowest likelihood of the leads on the list may result in a sale of insurance coverage.

In some cases, the methods 400, 500 may include generating, such as by the computing devices 212, a lead list comprising a list of insurance leads based on quotation information retrieved from the insurance quotation repository 240. In some cases, the lead list may be filtered by the computing devices 212 based on public information, such as a do-not-call list, property transaction information, a telephone directory, birth notices, death notices and/or the like. In some cases, the filter may be used to remove individuals named in a death notice, individuals associated with an invalid address, and individuals associated with an invalid name.

In some cases, the method 500 may include, at 510, at least one computing device (e.g., the computing devices 212) that may receive a list of insurance leads, such as from the insurance quotation repository 240. In some cases, the insurance leads may correspond to a plurality of non-binding insurance quotations provided to individuals that did not purchase insurance coverage. In some cases, the previously unfilled quotations may be used as a basis of a lead list for providing re-quotations for insurance coverage to the individuals associated with the previously unfilled leads. For example, information associated with the unfilled leads may include at least one of a quotation identifier, a name, an address, and a phone number.

At 520, a difference between the unfilled insurance quotation and a re-quotation may be identified. For example, the difference between the unfilled quotation and the re-quotation may include a reduction in cost and/or an increase in coverage amounts. In some cases, the difference may include a discount previously not offered to the individual, and/or a discount newly available to be offered. At 530, the one or more computing devices 212 may calculate a probability for each of the leads (e.g., individuals) associated with the lead list, where the probability corresponds to the likelihood that the individual receiving the re-quotation will purchase insurance coverage as a result of the re-quotation. In some cases, the likelihood may be computed using a model (e.g., a linear regression model, a logistic regression model, etc.) associated with a plurality of states. For example, the multi-state model 234 may be developed using information from a plurality of states and may be used for determining the likelihood that an individual resident in any of a number of states (e.g., states in a region, states in the nation, etc.) may purchase insurance coverage as a result of the re-quotation. In some cases, identifying information associated with each lead (e.g., a quotation number, a control number, a name, an address, a phone number) may be used to obtain details of an earlier provided quotation from the insurance quotation repository 240. This information may be used to determine differences between the non-binding quotation and a new re-quotation. In some cases, the information about the new and/or old insurance quotation may be used as inputs into the multi-state regression model (e.g., multi-state model 234). At 540, the computing device may assign a ranking to each of the leads on the lead list based on the probability output from the multi-state regression model. The ranking may be determined in relation to the other leads on the lead list. In some cases, a highest ranking entry on the lead list may correspond to a highest likelihood that lead may result in a sale of insurance coverage and a lowest ranked entry on the lead list may correspond to the lowest likelihood of the leads on the list may result in a sale of insurance coverage.

In some cases, the methods 400, 500 may include generating, such as by the computing devices 212, a lead list comprising a list of insurance leads based on quotation information retrieved from the insurance quotation repository 240. In some cases, the lead list may be filtered by the computing devices 212 based on public information, such as a do-not-call list, property transaction information, a telephone directory, birth notices, death notices and/or the like. In some cases, the filter may be used to remove individuals associated with a death notice, individuals associated with an invalid address, and individuals associated with an invalid name.

In some cases, the methods 400, 500 may include identifying individuals who received a previous quotation, but did not purchase insurance coverage, wherein the previous insurance quotation was provided within a within a specified time period previous to a current date. For example, the insurance quotation may have been provided within 3 months, within 6 months, etc. In some cases, the insurance leads may correspond to a longer time period, such as a year, or other time period associated with a renewal date for insurance coverage. In some cases, information associated with an insurance policy renewal date may be used as an input into the regression models (e.g., the state regression models 231, the multi-state regression model 234). In some cases, the computing device may be configured to develop a statewide regression model as a function of two or more input parameters in a qualitative response model using a logistic function, wherein the statewide logistic regression model is developed based on data gathered in a single state. For example a state regression model may include two or more input parameters including an insurance premium parameter, a number of insured items parameter, a discount parameter, an age parameter, a number of insured parameter, and a quotation method parameter. In some cases, the state logistic regression model further include an input corresponding to current insurance policy information associated with an insurance policy previously purchased by an individual, wherein the information includes at least one of an insurance provider identifier and a renewal date of the current insurance policy. In some cases, the state regression model may be configured to assign a weight to the current insurance policy information in relation to a difference between the renewal date and a present date. In some cases, a difference less than or equal to one month corresponds to a maximum weighting factor to be applied to the current insurance policy information.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A system comprising:
    an insurance quotation data repository computing device storing information corresponding to a plurality of historical unclosed insurance quotations that previously did not result in a sale;
    one or more computer devices comprising:

a processor; and a non-transitory memory device storing instructions that, when executed by the processor, cause the one or more computer devices to:

retrieve, from the insurance quotation data repository computing device, information associated with the plurality of historical unclosed insurance quotations, wherein the information retrieved from the insurance quotation data repository computing device includes at least one of a quotation identifier, a name, an address, and a phone number;

generate a list of insurance leads based on information stored on the insurance quotation data repository computing device including a type of insurance coverage to be offered and a geographic location of one or more individuals associated with the historical unclosed insurance quotations, wherein the one or more individuals received one of the historical unclosed insurance quotations but did not purchase insurance coverage;

store, in a lead list data repository, the list of insurance leads, wherein each lead in the list of insurance leads corresponds to an individual associated with at least one of the historical unclosed insurance quotations;

receive the list of insurance leads from the lead list data repository communicatively coupled to the one or more computing devices, wherein the insurance leads correspond to the plurality of historical unclosed insurance quotations;

generate a re-quotation for insurance coverage for each lead included on the list of insurance leads, the re-quotation including a difference from a previously unclosed insurance quotation, wherein the difference comprises at least one of an insurance coverage difference and a cost difference;

generate, based on analyzing the information associated with the plurality of historical insurance unclosed insurance quotations and information associated with the re-quotation, a multi-state regression model, wherein the multi-state regression model is common to a plurality of states;

calculate a likelihood of closing for each of the leads using the multi-state regression model;

determine a ranking for each of the leads based on the likelihood of closing output by the multi-state regression model, wherein the ranking for each of the leads is assigned in relation to other leads on the list of insurance leads; and communicate, via a network, a first portion of the list of insurance leads to a first remote network device and a second portion of the list of insurance leads to a second device, wherein the first portion of the list of insurance leads includes lead data records associated with a first ranking range and the second portion of the list of insurance leads includes lead data records associated with a second ranking range.

2. The system of claim 1, wherein the non-transitory memory device further stores instructions that, when executed by the processor, cause the one or more computing devices to:

filter the list of insurance leads based on a do-not-call list; and generate a filtered insurance lead list for evaluation using the multi-state regression model.

3. The system of claim 2, wherein the non-transitory memory device further stores instructions that, when executed by the processor, cause the one or more computing devices to:

filter the list of insurance leads based on public record information, wherein the public record information includes at least one of property transaction information, phone directory information, birth record information, death notice information, and name change information.

4. The system of claim 1, wherein the instructions to generate the list of insurance leads further comprises instructions that, when executed by the processor, cause the one or more computer devices to:

identify one or more previously unclosed insurance quotations that were generated within a specified time period; and generate the list of insurance leads using the identified one or more previously unclosed insurance quotations that were generated within the specified time period.

5. The system of claim 4, wherein the specified time period is six months.

6. The system of claim 1, wherein the multi-state regression model is generated as a function of two or more input parameters using a logistic regression function and is further based on historical insurance quotation information obtained from the plurality of states, and wherein the logistic regression function comprises a combination of an intercept parameter and two or more weighting parameters each associated with the two or more input parameters.

7. The system of claim 6, wherein inputs to the multi-state regression model comprise at least two of an insurance premium parameter, an insured items parameter, a discount parameter, a customer credit parameter, an age parameter, a number of insured individuals parameter, and a quotation method parameter.

8. The system of claim 7, wherein an input to the multi-state regression model corresponds to a current insurance policy associated with the individual, wherein the input comprises at least one of an insurance provider parameter and a renewal date parameter associated with the current insurance policy.

9. The system of claim 8, wherein a coefficient associated with the insurance provider parameter or the renewal date parameter corresponds to a time difference between a renewal date and a present date.

10. The system of claim 9, wherein the coefficient nears a maximum value when the time difference between the renewal date and the present date approaches approximately one month.

11. A method comprising:

retrieving, by a processor of a first computing device and from an insurance quotation data repository computing device, information associated with a plurality of historical unclosed insurance quotations that previously did not result in a sale, wherein the information includes at least one of a quotation identifier, a name, an address, and a phone number;

generating, by the processor, a list of insurance leads based on information stored on the insurance quotation data repository computing device including a type of insurance coverage to be offered and a geographic location of one or more individuals associated with the historical unclosed insurance quotations, wherein the one or more individuals received one of the historical unclosed insurance quotations but did not purchase insurance coverage;

storing, by the processor and in a lead list data repository, the list of insurance leads, wherein each lead in the list of insurance leads corresponds to an individual associated with at least one of the historical unclosed insurance quotations;

receiving, by the processor, the list of insurance leads from the lead list data repository communicatively coupled to the one or more computing devices, wherein the insurance leads correspond to the plurality of historical unclosed insurance quotations;

generating, by the processor, a re-quotation for insurance coverage for each lead included on the list of insurance leads, the re-quotation including a difference from a previously unclosed insurance quotation, wherein the difference comprises at least one of an insurance coverage difference and a cost difference;

generating, by the processor and based on analyzing the information associated with the plurality of historical insurance unclosed insurance quotations and information associated with the re-quotation, a multi-state regression model, wherein the multi-state regression model is common to a plurality of states;

calculating, by the processor, a likelihood of closing for each of the leads using the multi-state regression model;

determining, by the processor, a ranking for each of the leads based on the likelihood of closing output by the multi-state regression model, wherein the ranking for each of the leads is assigned in relation to other leads on the list of insurance leads; and communicating, by the processor and via a network, a first portion of the list of insurance leads to a first remote network device and a second portion of the list of insurance leads to a second device, wherein the first portion of the list of insurance leads includes lead data records associated with a first ranking range and the second portion of the list of insurance leads includes lead data records associated with a second ranking range.

12. The method of claim 11, further comprising:
filtering the list of insurance leads based on a do-not-call list; and
generating a filtered insurance lead list for evaluation using the multi-state regression model.

13. The method of claim 12, further comprising:
filtering the list of insurance leads based on public record information, wherein the public record information includes at least one of property transaction information, phone directory information, birth record information, death notice information, and name change information.

14. The method of claim 11, further comprising:
identifying one or more previously unclosed insurance quotations that were generated within a specified time period; and
generating the list of insurance leads using the identified one or more previously unclosed insurance quotations that were generated within the specified time period.

15. The method of claim 11, wherein the multi-state regression model is generated as a function of two or more input parameters using a logistic regression function and is further based on historical insurance quotation information obtained from the plurality of states, and wherein the logistic regression function comprises a combination of an intercept parameter and two or more weighting parameters each associated with the two or more input parameters.

16. The method of claim 15, wherein inputs to the multi-state regression model comprise at least two of an insurance premium parameter, an insured items parameter, a discount parameter, a customer credit parameter, an age parameter, a number of insured individuals parameter, and a quotation method parameter.

17. The method of claim 16, wherein an input to the multi-state regression model corresponds to a current insurance policy associated with the individual, wherein the input comprises at least one of a an insurance provider parameter and a renewal date parameter associated with the current insurance policy.

18. The method of claim 17, wherein a coefficient associated with the insurance provider parameter or the renewal date parameter corresponds to a time difference between a renewal date and a present date.

19. The method of claim 18, wherein the coefficient nears a maximum value when the time difference between the renewal date and the present date approaches approximately one month.

20. A non-transitory, computer-readable medium storing instructions that, when executed by a processor, cause the processor to:

retrieve, from an insurance quotation data repository computing device, information associated with the plurality of historical unclosed insurance quotations that previously did not result in a sale, wherein the information includes at least one of a quotation identifier, a name, an address, and a phone number;

generate a list of insurance leads based on information stored on the insurance quotation data repository computing device including a type of insurance coverage to be offered and a geographic location of one or more individuals associated with the historical unclosed insurance quotations, wherein the one or more individuals received one of the historical unclosed insurance quotations but did not purchase insurance coverage;

store, in a lead list data repository, the list of insurance leads, wherein each lead in the list of insurance leads corresponds to an individual associated with at least one of the historical unclosed insurance quotations;

receive the list of insurance leads from the lead list data repository communicatively coupled to the one or more computing devices, wherein the insurance leads correspond to the plurality of historical unclosed insurance quotations;

generate a re-quotation for insurance coverage for each lead included on the list of insurance leads, the re-quotation including a difference from a previously unclosed insurance quotation, wherein the difference comprises at least one of an insurance coverage difference and a cost difference;

generate, based on analyzing the information associated with the plurality of historical insurance unclosed insurance quotations and information associated with the re-quotation, a multi-state regression model, wherein the multi-state regression model is common to a plurality of states;

calculate a likelihood of closing for each of the leads using the multi-state regression model;

determine a ranking for each of the leads based on the likelihood of closing output by the multi-state regression model, wherein the ranking for each of the leads is assigned in relation to other leads on the list of insurance leads; and communicate, via a network, a first portion of the list of insurance leads to a first remote network device and a second portion of the list of insurance leads to a second device, wherein the first portion of the list of insurance leads includes lead data records associated with a first ranking range and the second portion of the list of insurance leads includes lead data records associated with a second ranking range.

\* \* \* \* \*

UNITED STATES PATENT AND TRADEMARK OFFICE
CERTIFICATE OF CORRECTION

PATENT NO. : 10,482,536 B1
APPLICATION NO. : 14/327242
DATED : November 19, 2019
INVENTOR(S) : Doyle et al.

Page 1 of 1

It is certified that error appears in the above-identified patent and that said Letters Patent is hereby corrected as shown below:

In the Specification

Column 17, Detailed Description, Line 26:
Delete "23" and insert --230--

Column 18, Detailed Description, Line 18:
Delete "multistate" and insert --multi-state--

Column 24, Detailed Description, Line 12:
Delete "231-214." and insert --231-234.--

In the Claims

Column 30, Line 14:
In Claim 17, after "of", delete "a"

Signed and Sealed this
Twenty-fourth Day of November, 2020

Andrei Iancu
*Director of the United States Patent and Trademark Office*